(12) United States Patent
Uscinski

(10) Patent No.: US 11,508,141 B2
(45) Date of Patent: Nov. 22, 2022

(54) SIMPLE ENVIRONMENT SOLVER USING PLANAR EXTRACTION

(71) Applicant: Magic Leap, inc., Plantation, FL (US)

(72) Inventor: Benjamin Joseph Uscinski, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 204 days.

(21) Appl. No.: 16/912,646

(22) Filed: Jun. 25, 2020

(65) Prior Publication Data

US 2021/0004630 A1    Jan. 7, 2021

Related U.S. Application Data

(60) Provisional application No. 62/870,193, filed on Jul. 3, 2019.

(51) Int. Cl.
| | |
|---|---|
| *G06V 10/44* | (2022.01) |
| *G06T 7/593* | (2017.01) |
| *G06T 7/564* | (2017.01) |
| *G06T 19/00* | (2011.01) |

(52) U.S. Cl.
CPC .............. *G06V 10/44* (2022.01); *G06T 7/564* (2017.01); *G06T 7/593* (2017.01); *G06T 19/006* (2013.01)

(58) Field of Classification Search
None
See application file for complete search history.

(56) References Cited

U.S. PATENT DOCUMENTS

| | | | |
|---|---|---|---|
| 8,264,546 B2 * | 9/2012 | Witt ..................... | H04N 5/2224 348/222.1 |
| 11,024,095 B2 * | 6/2021 | Steinbrücker ........... | G06T 19/00 |
| 11,210,808 B2 * | 12/2021 | Woods ................ | G06F 3/04815 |
| 11,238,659 B2 * | 2/2022 | Swaminathan ......... | G06T 17/00 |
| 2019/0080516 A1 * | 3/2019 | Petrovskaya .......... | G06V 20/20 |
| 2019/0170510 A1 | 6/2019 | Robinson | |
| 2020/0090406 A1 * | 3/2020 | Booth ..................... | G06T 15/04 |
| 2020/0111250 A1 * | 4/2020 | Huang .................... | G06T 17/00 |
| 2021/0012571 A1 * | 1/2021 | Booth ..................... | G06T 15/04 |
| 2021/0034144 A1 * | 2/2021 | Powers ................... | G06T 7/181 |
| 2022/0066456 A1 * | 3/2022 | Ebrahimi Afrouzi ....................... | G05D 1/0214 |
| 2022/0067965 A1 * | 3/2022 | Woods ................. | G06T 19/006 |

OTHER PUBLICATIONS

International Search Report and Written Opinion dated Oct. 13, 2020 in connection with International Application No. PCT/US2020/039631.

* cited by examiner

*Primary Examiner* — Anand P Bhatnagar
(74) *Attorney, Agent, or Firm* — Wolf, Greenfield & Sacks, P.C.

(57) ABSTRACT

A method to reconstruct an environment is provided. The method makes available to a wide variety of XR applications fresh and accurate 3D reconstruction data of environments with low processing time and low usage of computational resources and storage spaces. The 3D reconstruction data are structured in a way to be efficiently shared between users for multi-user experiences. The method includes obtaining plane segments of an environment, identifying surface planes of the environment by, for example, filtering and grouping the plane segments or ad hoc selection of the plane segments by a user, and inferring corner points of the environment based on the surface planes. The corner points are used to build a 3D representation of the environment when an XR application requires.

20 Claims, 28 Drawing Sheets

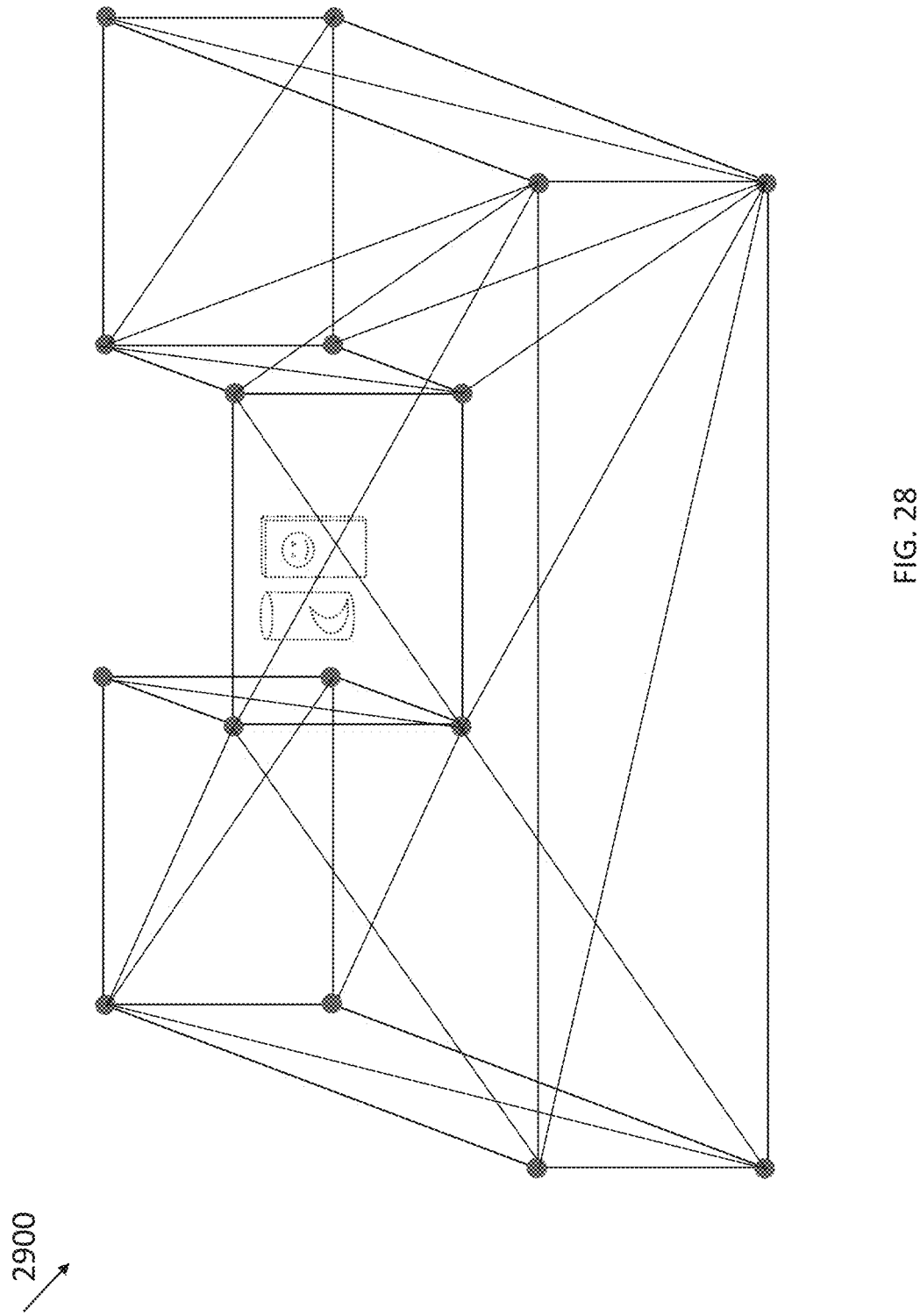

SIMPLE ENVIRONMENT SOLVER USING PLANAR EXTRACTION

RELATED APPLICATIONS

This application claims priority to and the benefit of U.S. Provisional Patent Application Ser. No. 62/870,193, filed Jul. 3, 2019 and entitled "SIMPLE ENVIRONMENT SOLVER USING PLANAR EXTRACTION," which is hereby incorporated herein by reference in its entirety.

TECHNICAL FIELD

This application relates generally to cross reality systems that use a 3D world reconstruction to render scenes.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

An XR system may represent the physical world around a user of the system as a "mesh." A mesh may be represented by multiple, interconnected triangles. Each triangle has edges joining points on a surface of an object within the physical world, such that each triangle represents a portion of the surface. Information about the portion of the surface, such as color, texture or other properties may be stored in associate within the triangle. In operation, an XR system may process image information to detect points that and surfaces so as to create or update the mesh.

BRIEF SUMMARY

Aspects of the present application relate to methods and apparatus for quickly generating environments containing computer-generated objects. Techniques as described herein may be used together, separately, or in any suitable combination.

Some embodiments relate to a portable electronic system. The portable electronic system includes a sensor configured to capture information about a physical world and a processor configured to execute computer executable instructions to compute a three-dimensional (3D) representation of a portion of the physical world based at least in part on the captured information about the physical world. The computer executable instructions include instructions for: extracting a plurality of plane segments from the sensor-captured information; identifying a plurality of surface planes based at least in part on the plurality of plane segments; and inferring a plurality of corner points of the portion of the physical world based at least in part on the plurality of surface planes.

In some embodiments, the computer executable instructions further comprise instructions for building a mesh model of the portion of the physical world, using the corner points.

In some embodiments, the plurality of surface planes are identified at least partially based on input from a user wearing at least a portion of the portable electronic system.

In some embodiments, the portable electronic system includes a transceiver configured for communication over a computer network with a device providing remote memory.

In some embodiments, the processor implements a service configured to provide the 3D representation of the portion of the physical world to an application.

In some embodiments, the service preserves the corner points in a local memory or transfers the corner points to a cloud memory as the three-dimensional (3D) representation of the portion of the physical world.

In some embodiments, identifying the plurality of surface planes includes determining whether there is a dominant plane segment normal among a group of plane segment normals of the plurality of plane segments; when the determining indicates a dominant plane segment normal of the group, setting the dominant plane segment normal as a surface plane normal; and when the determining indicates no dominant plane segment normal of the group, computing the surface plane normal from at least a portion of the plane segment normals of the group.

In some embodiments, computing the surface plane normal includes computing a weighted average of the at least a portion of the plane segment normals of the group.

In some embodiments, inferring the plurality of corner points of the portion of the physical world includes extending into infinity first and second surface planes of the plurality of surface planes; and obtaining a boundary line that intersects the first and second surface planes.

In some embodiments, inferring the plurality of corner points of the portion of the physical world further includes inferring one of the plurality of corner points by intersecting the boundary line with a third surface plane.

Some embodiments relate to at least one non-transitory computer-readable medium encoded with a plurality of computer-executable instructions that, when executed by at least one processor, perform a method for providing a three-dimensional (3D) representation of a portion of a physical world in which the portion of the physical world is represented with a plurality of corner points. The method includes capturing information about a portion of the physical world that is within a field-of-view (FOV) of a user; extracting a plurality of plane segments from the captured information; identifying a plurality of surface planes from the plurality of plane segments; and computing a plurality of corner points representing the portion of the physical world based on intersections of surface planes of the plurality of identified surface planes.

In some embodiments, the method includes computing whether first plurality of corner points form a closure.

In some embodiments, computing whether a closure is formed comprises determining whether boundary lines joining the first plurality of corner points can be connected to define surfaces that join up and bound a closed volume.

In some embodiments, the portion of the physical world is a first portion of the physical world, the user is a first user, the plurality of corner points are a first plurality of corner points; and the method further comprises: receiving from a second user a second plurality of corner points of a second portion of the physical world; and providing the 3D representation of the physical world based at least in part on the first and second plurality of corner points.

In some embodiments, the user is a first user, the method further comprises: communicating over a computer network the corner points computed from information captured about the portion of the physical world that is within the FOV of the first user; receiving the communicated corner points at an XR device used by a second user; and rendering information, with the XR device, to the second user about the portion of the physical world based on the received plurality of corner points.

In some embodiments, the method includes computing metadata for the corner points, the metadata indicating location relationships between the corner points.

In some embodiments, the method includes preserving the corner points, including respective metadata, such that the corner points are retrievable by a plurality of users including the user.

Some embodiments relate to a method of operating a cross reality system to reconstruct an environment. The cross reality system includes a processor configured to process image information in communication with a sensor worn by a user that generates depth information for respective regions in a field of view of the sensor. The method includes extracting a plurality of plane segments from the depth information; displaying the extracted plane segments to the user; receiving user input indicating a plurality of surface planes, each representing a surface bounding the environment; and computing a plurality of corner points of the environment based at least in part on the plurality of surface planes.

In some embodiments, the method includes determining whether the plurality of corner points form a closure.

In some embodiments, the method includes storing the corner points when it is determined that the closure is formed.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 28 is a schematic diagram illustrating a 3D reconstruction of the environment in FIG. 24 based at least in part on corner points, according to some embodiments.

DETAILED DESCRIPTION

Figure 1:
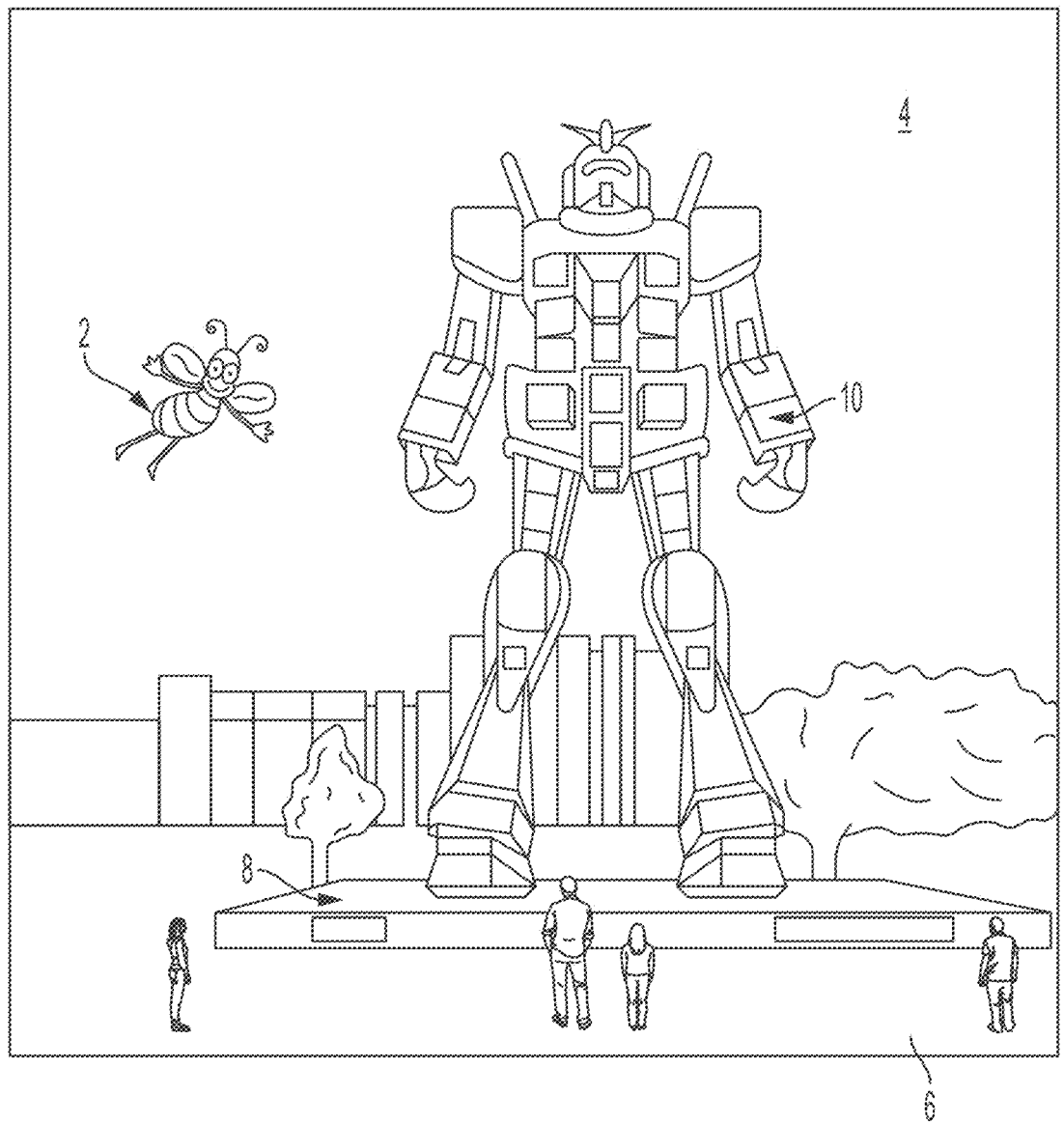
FIG. 1 is a sketch illustrating an example of a simplified augmented reality (AR) scene, according to some embodiments.

Described herein are methods and apparatus for creating and using a three-dimensional (3D) world reconstruction of an environment, such as an indoor environment, in an X Reality (XR or cross reality) system. Conventionally, a 3D representation of an environment is built by scanning the entire environment including, for example, walls, floors, and ceilings, with an XR system held and/or worn by a user. The XR system generates dense meshes to represent the environment. The inventors have recognized and appreciated that a dense mesh may include details that are unnecessary for a particular task being performed by the XR system. For example, the system might build a dense mesh model with numerous triangles to represent small defects on a wall and to represent any decorations on the wall, but that model may be used by an application that presents virtual objects covering surfaces of the walls or that identifies the locations of walls or computes the area of the walls—tasks that might not be impacted by small defects on the walls, or might not be achieved if the area of the walls cannot be computed accurately because of decorations coverings the walls' surfaces. Examples of such an application may include home contracting applications, for which data representing the structure of a room might be sufficient, and a game such as "Dr. Grordbort's Invaders," which requires data representing an area of a wall allowing port holes to be opened for evil robots, and may give false error message of not enough wall space because of decorations covering a wall surface.

The inventors have recognized and appreciated techniques to quickly and accurately represent a room or other portion of an environment as a set of corner points. The corner points may be derived by identifying surface planes, representing surfaces of the environment, such as any walls, floors, and/or ceilings. The surface planes may be computed from information collected by sensors on a wearable device, which may be used to scan part of an environment. The sensors may provide depth and/or image information. An XR system may obtain plane segments from the depth and/or image information. Each plane segment may indicate an orientation of a plane that the plane segment represents by, for example, a plane normal. The XR system may then identify the surface planes of the environment from groups of one or more plane segments. In some embodiments, the surface planes may be selected ad hoc by a user operating the XR system. In some embodiments, the XR system may identify the surface planes automatically.

A 3D representation of the environment may be reconstructed quickly and accurately using the corner points of the environment. A simple mesh representation of the environment, for example, may be generated from the corner points and used instead of or in addition to a mesh computed in a conventional way. In some embodiments, for a multi-user experience, the corner points may be transmitted between multiple users in an XR experience involving the environment. The corner points of the environment can be transmitted significantly faster than a dense mesh of the environment. Further, building a 3D representation of the environment based on the corner points of the environment consumes less computing power, storage space and network bandwidth, compared with scanning a dense mesh of the entire environment.

Techniques as described herein may be used together or separately with many types of devices and for many types of scenes, including wearable or portable devices with limited computations resources that provide a cross reality scene. In some embodiments, the techniques may be implemented by a service that forms a portion of an XR system. Applications performing tasks for which a simple information reconstructing an environment is sufficient may interact with this service to obtain a set of corner points, with or without associated metadata about the points and/or surfaces that those points bound, to render information about the environment. Applications, for example, may render virtual objects with respect to those surfaces. For example, an application may render virtual pictures or other objects hanging on the walls. As another example, an application may render a virtual color overlay on the wall to change its perceived color or may display tags on surfaces of the environment, such as a tag indicating the area of the surface, an amount of paint required to cover that surface or other information that might be computed about the environment.

AR System Overview

Figure 2:
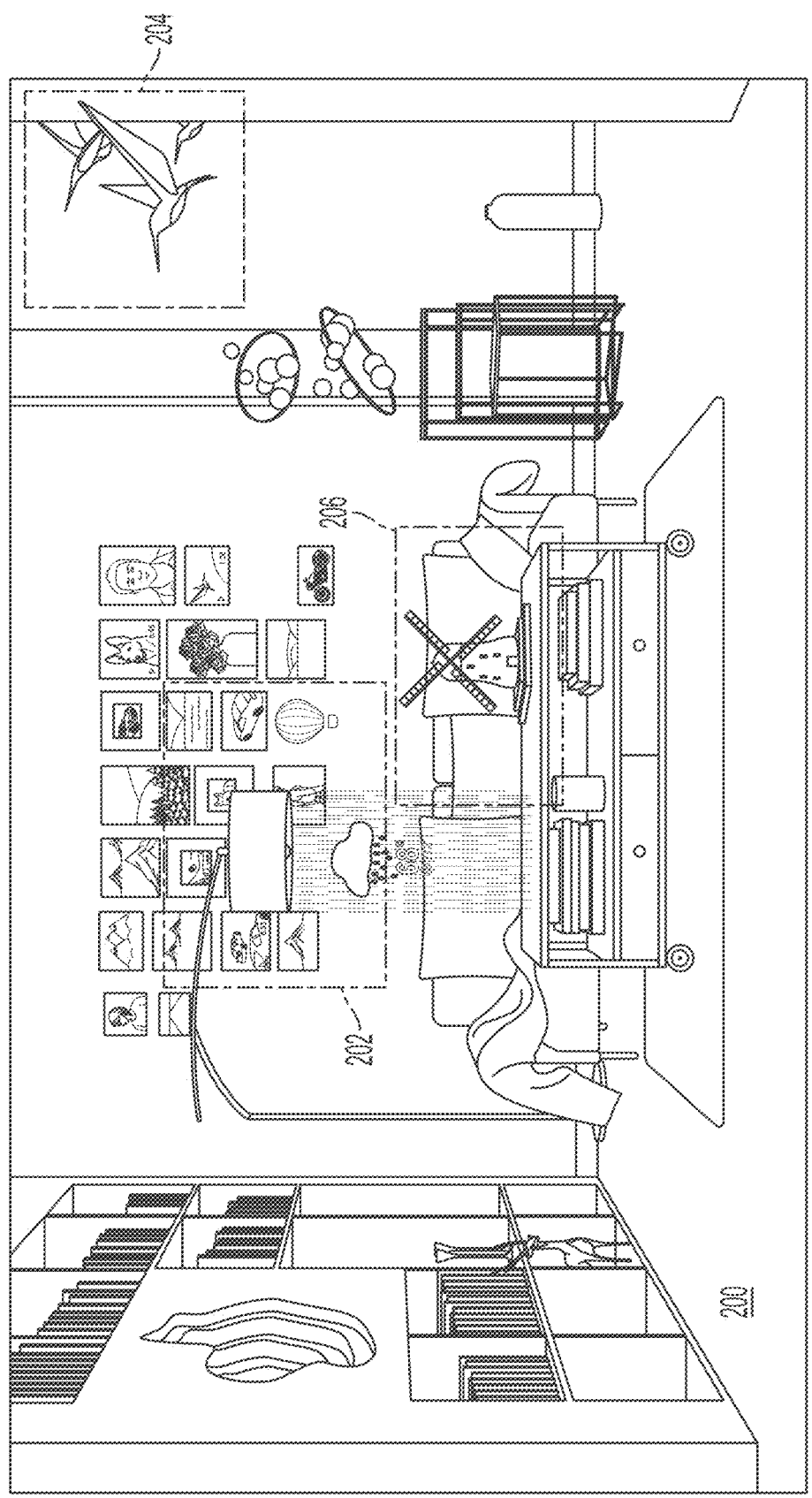
FIG. 2 is a sketch of an exemplary simplified AR scene, showing exemplary World Reconstruction use cases including visual occlusion, physics-based interactions, and environment reasoning, according to some embodiments.

FIGS. 1-2 illustrate such scenes. For purposes of illustration, an AR system is used as an example of an XR system. FIGS. 3-8 illustrate an exemplary AR system, including one or more processors, memory, sensors and user interfaces that may operate according to the techniques described herein.

Referring to Figure (FIG. 1, an outdoor AR scene 4 is depicted wherein a user of an AR technology sees a physical world park-like setting 6, featuring people, trees, buildings in the background, and a concrete platform 8. In addition to these items, the user of the AR technology also perceives that they "see" a robot statue 10 standing upon the physical world concrete platform 8, and a cartoon-like avatar character 2 flying by which seems to be a personification of a bumble bee, even though these elements (e.g., the avatar character 2, and the robot statue 10) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that includes a world reconstruction component, which may build and update a representation of the physical world surfaces around the user. This representation may be used to occlude rendering, to place virtual objects, in physics based interactions, and for virtual character path planning and navigation, or for other operations in which information about the physical world is used. FIG. 2 depicts another example of an AR scene 200, showing exemplary world reconstruction use cases, including visual occlusion 202, physics-based interactions 204, and environment reasoning 206, according to some embodiments.

The exemplary scene 200 is a living room having walls, a book shelf on one side of a wall, a floor lamp at a corner of the room, a floor, a sofa and coffee table on the floor. In addition to these physical items, the user of the AR technology also perceives virtual objects such as images on the wall behind the sofa, birds flying through the door, a deer peeking out from the book shelf, and a decoration in the form of a windmill placed on the coffee table. For the images on the wall, the AR technology requires information about not only surfaces of the wall but also objects and surfaces in the room such as lamp shape, which are occluding the images to render the virtual objects correctly. For the flying birds flying, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may reason that it is movable, whereas corners of shelves or corners of the wall may be reasoned to be stationary. Such a distinction may be used in reasoning as to which portions of the scene are used or updated in each of various operations.

A scene may be presented to the user via a system that includes multiple components, including a user interface that can stimulate one or more user senses, including sight sound and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or more be distributed across multiple interconnected devices. In some embodiments some or all of these components may be integrated into a wearable device.

Figure 3:
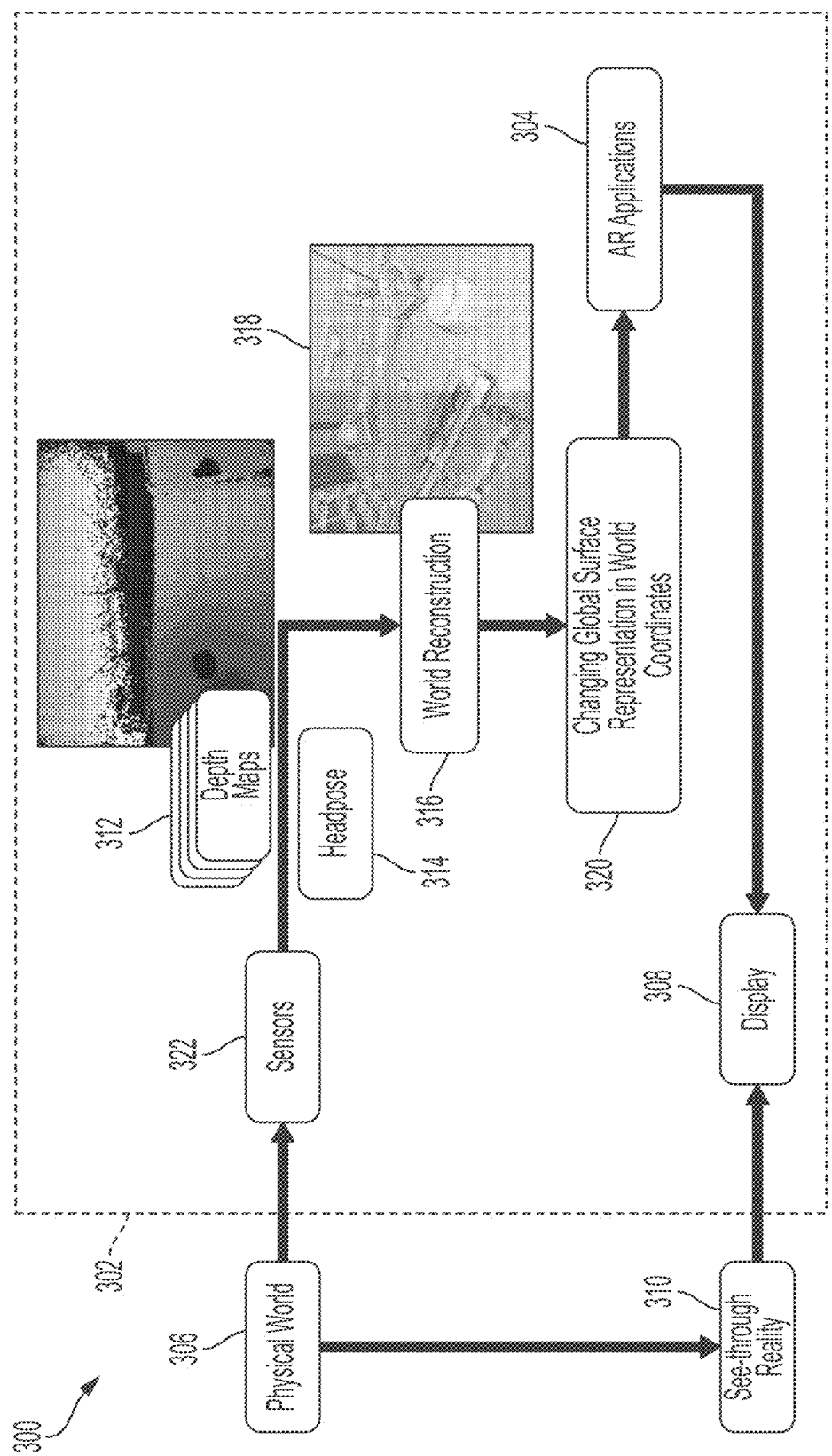
FIG. 3 is a schematic diagram illustrating data flow in an AR system configured to provide an experience of AR content interacting with a physical world, according to some embodiments.

FIG. 3 depicts an AR system 302 configured to provide an experience of AR content interacting with a physical world 306, according to some embodiments. The AR system 302 may include a display 308. In the illustrated embodiment, the display 308 may be worn by the user as part of a headset such that a user may wear the display over their eyes like a pair of goggles or glasses. At least a portion of the display may be transparent such that a user may observe a see-through reality 310. The see-through reality 310 may correspond to portions of the physical world 306 that are within a present viewpoint of the AR system 302, which may correspond to the viewpoint of the user in the case that the user is wearing a headset incorporating both the display and sensors of the AR system to acquire information about the physical world.

AR content may also be presented on the display 308, overlaid on the see-through reality 310. To provide accurate interactions between AR content and the see-through reality 310 on the display 308, the AR system 302 may include sensors 322 configured to capture information about the physical world 306.

The sensors 322 may include one or more depth sensors that output depth maps 312. Each depth map 312 may have multiple pixels, each of which may represent a distance to a surface in the physical world 306 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire information that may be processed to represent the physical world in other ways. For example, the images may be processed in world reconstruction component 316 to create a mesh, representing connected portions of objects in the physical world. Metadata about such objects, including for example, color and surface texture, may similarly be acquired with the sensors and stored as part of the world reconstruction.

The system may also acquire information about the headpose of the user with respect to the physical world. In some embodiments, sensors 310 may include inertial measurement units that may be used to compute and/or determine a headpose 314. A headpose 314 for a depth map may indicate a present viewpoint of a sensor capturing the depth map with six degrees of freedom (6DoF), for example, but the headpose 314 may be used for other purposes, such as to relate image information to a particular portion of the physical world or to relate the position of the display worn on the user's head to the physical world. In some embodiments, the headpose information may be derived in other ways than from an IMU, such as from analyzing objects in an image.

The world reconstruction component 316 may receive the depth maps 312 and headposes 314, and any other data from the sensors, and integrate that data into a reconstruction 318, which may at least appears to be a single, combined reconstruction. The reconstruction 318 may be more complete and less noisy than the sensor data. The world reconstruction component 316 may update the reconstruction 318 using spatial and temporal averaging of the sensor data from multiple viewpoints over time.

The reconstruction 318 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 318, portions of the physical world are presented as a global surface; on the right side of the reconstruction 318, portions of the physical world are presented as meshes.

The reconstruction 318 may be used for AR functions, such as producing a surface representation of the physical world for occlusion processing or physics-based processing. This surface representation may change as the user moves or objects in the physical world change. Aspects of the reconstruction 318 may be used, for example, by a component 320 that produces a changing global surface representation in world coordinates, which may be used by other components.

The AR content may be generated based on this information, such as by AR applications 304. An AR application 304 may be a game program, for example, that performs one or more functions based on information about the physical world, such visual occlusion, physics-based interactions, and environment reasoning. It may perform these functions by querying data in different formats from the reconstruction 318 produced by the world reconstruction component 316. In some embodiments, component 320 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 304 may use this information to generate and update the AR content. The virtual portion of the AR content may be presented on the display 308 in combination with the see-through reality 310, creating a realistic user experience.

Figure 4:
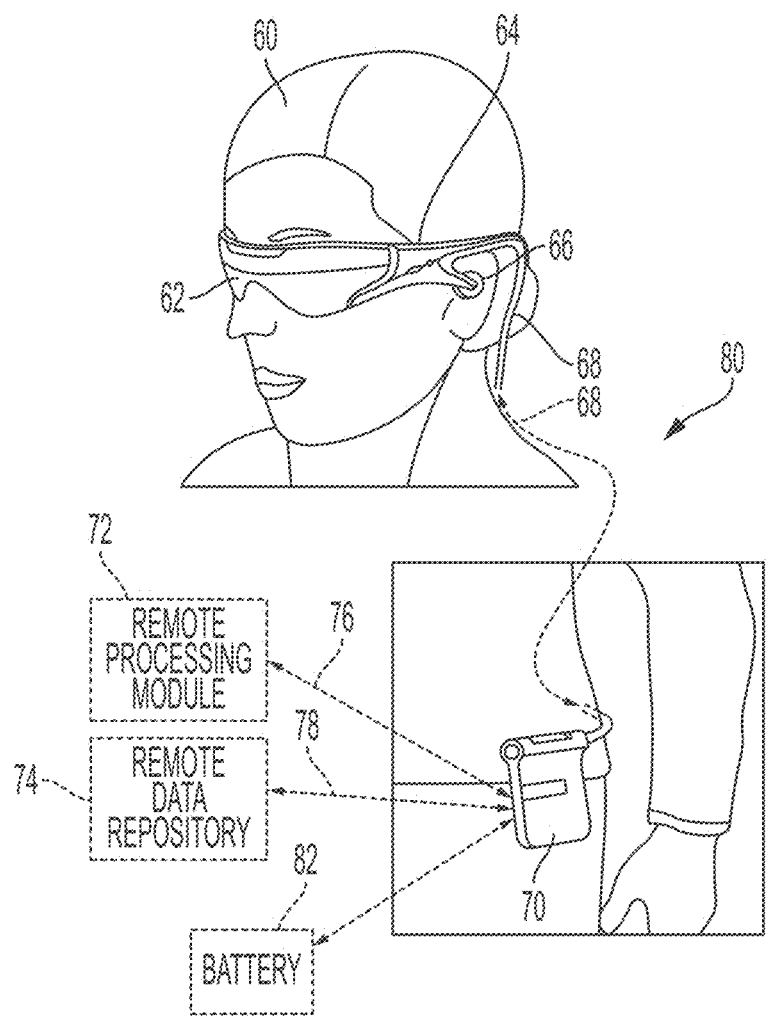
FIG. 4 is a schematic diagram illustrating an example of an AR display system, according to some embodiments.

In some embodiments, an AR experience may be provided to a user through a wearable display system. FIG. 4 illustrates an example of wearable display system 80 (hereinafter referred to as "system 80"). The system 80 includes a head mounted display device 62 (hereinafter referred to as "display device 62"), and various mechanical and electronic modules and systems to support the functioning of the display device 62. The display device 62 may be coupled to a frame 64, which is wearable by a display system user or viewer 60 (hereinafter referred to as "user 60") and configured to position the display device 62 in front of the eyes of the user 60. According to various embodiments, the display device 62 may be a sequential display. The display device 62 may be monocular or binocular. In some embodiments, the display device 62 may be an example of the display 308 in FIG. 3.

In some embodiments, a speaker 66 is coupled to the frame 64 and positioned proximate an ear canal of the user 60. In some embodiments, another speaker, not shown, is positioned adjacent another ear canal of the user 60 to provide for stereo/shapeable sound control. The display device 62 is operatively coupled, such as by a wired lead or wireless connectivity 68, to a local data processing module 70 which may be mounted in a variety of configurations, such as fixedly attached to the frame 64, fixedly attached to a helmet or hat worn by the user 60, embedded in headphones, or otherwise removably attached to the user 60 (e.g., in a backpack-style configuration, in a belt-coupling style configuration).

The local data processing module 70 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 64) or otherwise attached to the user 60, such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display device 62 after such processing or retrieval. The local data processing module 70 may be operatively coupled by communication links 76, 78, such as via a wired or wireless communication links, to the remote processing module 72 and remote data repository 74, respectively, such that these remote modules 72, 74 are operatively coupled to each other and available as resources to the local processing and data module 70. In some embodiments, the world reconstruction component 316 in FIG. 3 may be at least partially implemented in the local data processing module 70. For example, the local data processing module 70 may be configured to execute computer executable instructions to generate the physical world representations based at least in part on at least a portion of the data.

In some embodiments, the local data processing module 70 may include one or more processors (e.g., a graphics processing unit (GPU)) configured to analyze and process data and/or image information. In some embodiments, the local data processing module 70 may include a single processor (e.g., a single-core or multi-core ARM processor), which would limit the module 70's compute budget but enable a more miniature device. In some embodiments, the world reconstruction component 316 may use a compute budget less than a single ARM core to generate physical world representations in real-time on a non-predefined space such that the remaining compute budget of the single ARM core can be accessed for other uses such as, for example, extracting meshes.

In some embodiments, the remote data repository 74 may include a digital data storage facility, which may be available through the Internet or other networking configuration in a "cloud" resource configuration. In some embodiments, all data is stored and all computations are performed in the local data processing module 70, allowing fully autonomous use from a remote module. A world reconstruction, for example, may be stored in whole or in part in this repository 74.

In some embodiments, the local data processing module 70 is operatively coupled to a battery 82. In some embodiments, the battery 82 is a removable power source, such as over the counter batteries. In other embodiments, the battery 82 is a lithium-ion battery. In some embodiments, the battery 82 includes both an internal lithium-ion battery chargeable by the user 60 during non-operation times of the system 80 and removable batteries such that the user 60 may operate the system 80 for longer periods of time without having to be tethered to a power source to charge the lithium-ion battery or having to shut the system 80 off to replace batteries.

Figure 5A:
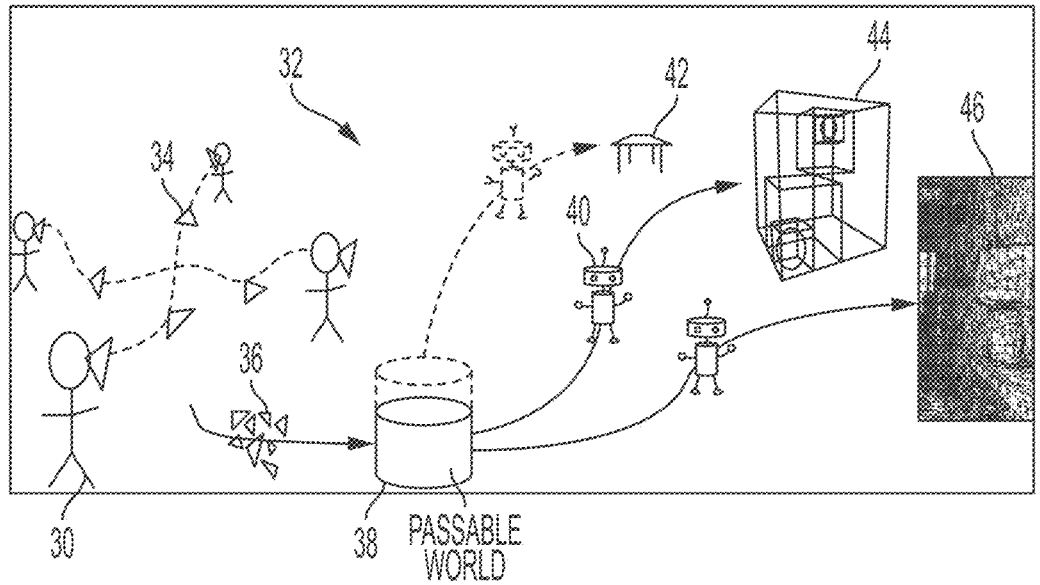
FIG. 5A is a schematic diagram illustrating a user wearing an AR display system rendering AR content as the user moves through a physical world environment, according to some embodiments.

FIG. 5A illustrates a user 30 wearing an AR display system rendering AR content as the user 30 moves through a physical world environment 32 (hereinafter referred to as "environment 32"). The user 30 positions the AR display system at positions 34, and the AR display system records ambient information of a passable world (e.g., a digital representation of the real objects in the physical world that can be stored and updated with changes to the real objects in the physical world) relative to the positions 34 such as pose relation to mapped features or directional audio inputs. The positions 34 are aggregated to data inputs 36 and processed at least by a passable world module 38, which may be implemented, for example, by processing on a remote processing module 72 of FIG. 4. In some embodiments, the passable world module 38 may include the world reconstruction component 316.

The passable world module 38 determines where and how AR content 40 can be placed in the physical world as determined from the data inputs 36. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 42 (e.g., a table) from a reconstruction (e.g., the reconstruction 318) to determine the shape and position of the AR content 40. As an example, the fixed element may be a table and the virtual content may be positioned such that it appears to be on that table. In some embodiments, the AR content may be placed within structures in a field of view 44, which may be a present field of view or an estimated future field of view. In some embodiments, the AR content may be placed relative to a mapped mesh model 46 of the physical world.

As depicted, the fixed element 42 serves as a proxy for any fixed element within the physical world which may be stored in the passable world module 38 so that the user 30 can perceive content on the fixed element 42 without the system having to map to the fixed element 42 each time the user 30 sees it. The fixed element 42 may, therefore, be a mapped mesh model from a previous modeling session or determined from a separate user but nonetheless stored on the passable world module 38 for future reference by a plurality of users. Therefore, the passable world module 38 may recognize the environment 32 from a previously mapped environment and display AR content without a device of the user 30 mapping the environment 32 first, saving computation process and cycles and avoiding latency of any rendered AR content.

The mapped mesh model 46 of the physical world may be created by the AR display system and appropriate surfaces and metrics for interacting and displaying the AR content 40 can be mapped and stored in the passable world module 38 for future retrieval by the user 30 or other users without the need to re-map or model. In some embodiments, the data inputs 36 are inputs such as geolocation, user identification, and current activity to indicate to the passable world module 38 which fixed element 42 of one or more fixed elements are available, which AR content 40 has last been placed on the fixed element 42, and whether to display that same content (such AR content being "persistent" content regardless of user viewing a particular passable world model).

Even in embodiments in which objects are considered to be fixed, the passable world module 38 may be updated from time to time to account for the possibility of changes in the physical world. The model of fixed objects may be updated with a very low frequency. Other objects in the physical world may be moving or otherwise not regarded as fixed. To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 5B:
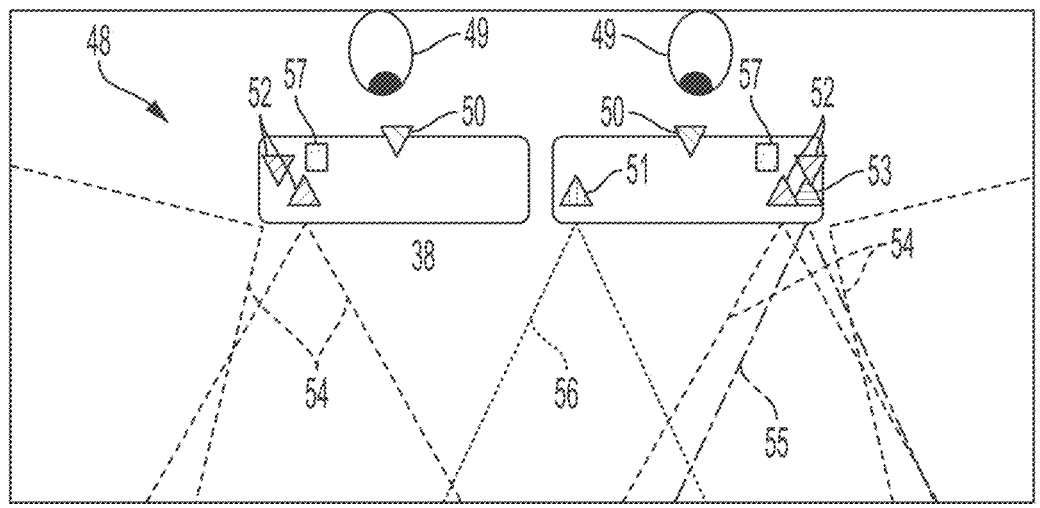
FIG. 5B is a schematic diagram illustrating a viewing optics assembly and attendant components, according to some embodiments.

FIG. 5B is a schematic illustration of a viewing optics assembly 48 and attendant components. In some embodiments, two eye tracking cameras 50, directed toward user eyes 49, detect metrics of the user eyes 49, such as eye shape, eyelid occlusion, pupil direction and glint on the user eyes 49. In some embodiments, one of the sensors may be a depth sensor 51, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 52 record a greater-than-peripheral view to map the environment 32 and detect inputs that may affect AR content. In some embodiments, the world camera 52 and/or camera 53 may be grayscale and/or color image sensors, which may output grayscale and/or color image frames at fixed time intervals. Camera 53 may further capture physical world images within a field of view of the user at a specific time. Pixels of a frame-based image sensor may be sampled repetitively even if their values are unchanged. Each of the world cameras 52, the camera 53 and the depth sensor 51 have respective fields of view of 54, 55, and 56 to collect data from and record a physical world scene, such as the physical world environment 32 depicted in FIG. 5A.

Inertial measurement units 57 may determine movement and orientation of the viewing optics assembly 48. In some embodiments, each component is operatively coupled to at least one other component. For example, the depth sensor 51 is operatively coupled to the eye tracking cameras 50 as a confirmation of measured accommodation against actual distance the user eyes 49 are looking at.

It should be appreciated that a viewing optics assembly 48 may include some of the components illustrated in FIG. 5B and may include components instead of or in addition to the components illustrated. In some embodiments, for example, a viewing optics assembly 48 may include two world camera 52 instead of four. Alternatively or additionally, cameras 52 and 53 need not capture a visible light image of their full field of view. A viewing optics assembly 48 may include other types of components. In some embodiments, a viewing optics assembly 48 may include one or more dynamic vision sensor (DVS), whose pixels may respond asynchronously to relative changes in light intensity exceeding a threshold.

In some embodiments, a viewing optics assembly 48 may not include the depth sensor 51 based on time of flight information. In some embodiments, for example, a viewing optics assembly 48 may include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 51.

It also should be appreciated that the configuration of the components in FIG. 5B is illustrated as an example. A viewing optics assembly 48 may include components with any suitable configuration, which may be set to provide the user with the largest field of view practical for a particular set of components. For example, if a viewing optics assembly 48 has one world camera 52, the world camera may be placed in a center region of the viewing optics assembly instead of at a side.

Information from the sensors in viewing optics assembly 48 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g. clip content to account for occlusions), when viewed through the user interface. Regardless of how content is presented to a user, a model of the physical world is required so that characteristics of the virtual objects, which can be impacted by physical objects, including the shape, position, motion and visibility of the virtual object, can be correctly computed. In some embodiments, the model may include the reconstruction of a physical world, for example, the reconstruction 318.

That model may be created from data collected from sensors on a wearable device of the user. Though, in some embodiments, the model may be created from data collected by multiple users, which may be aggregated in a computing device remote from all of the users (and which may be "in the cloud").

Figure 6:
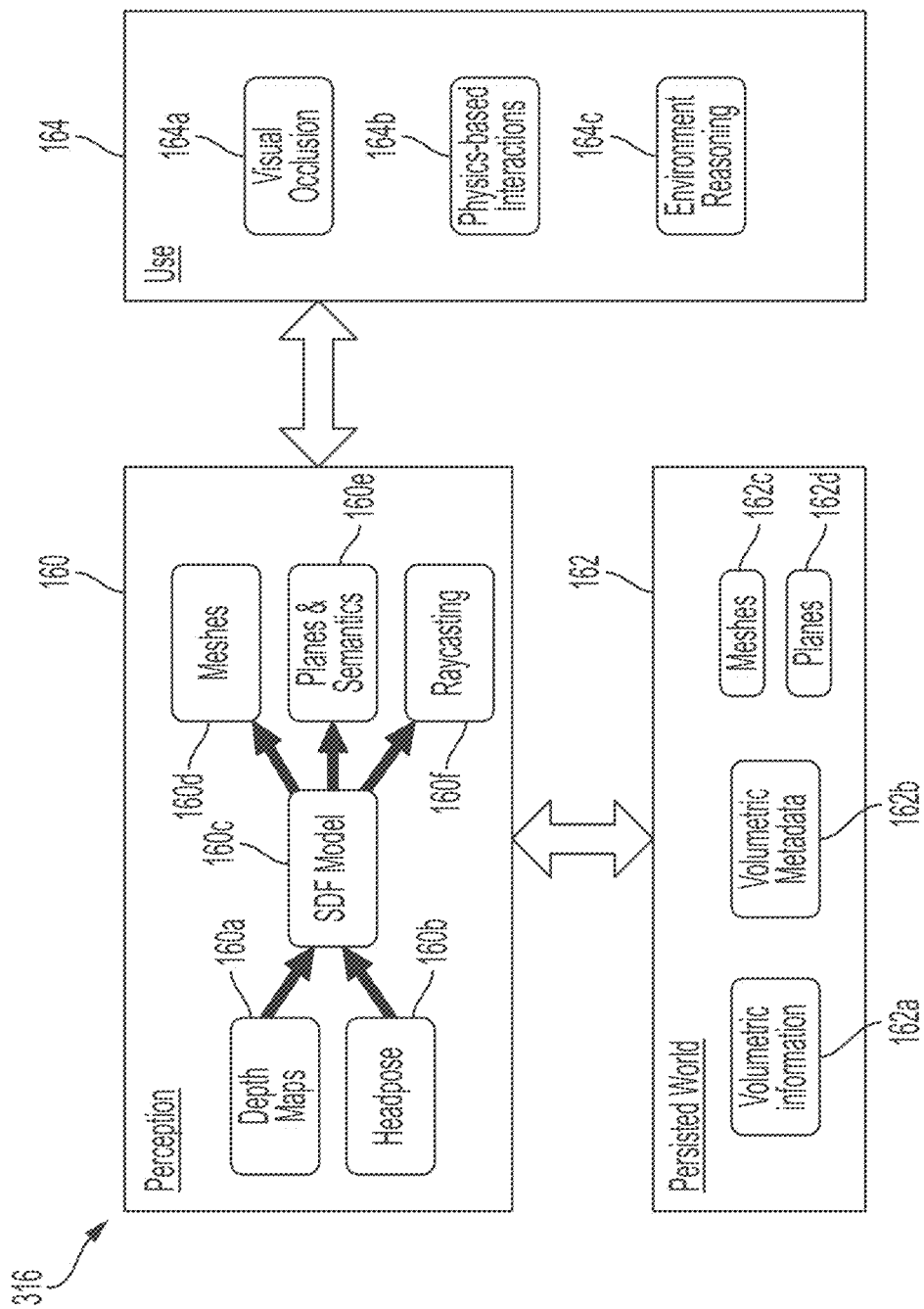
FIG. 6 is a schematic diagram illustrating an AR system using a world reconstruction system, according to some embodiments.

The model may be created, at least in part, by a world reconstruction system, for example, the world reconstruction component 316 of FIG. 3 depicted in more detail in FIG. 6. The world reconstruction component 316 may include a perception module 160 that may generate, update, and store representations for a portion of the physical world. In some embodiments, the perception module 160 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

Figure 7C:
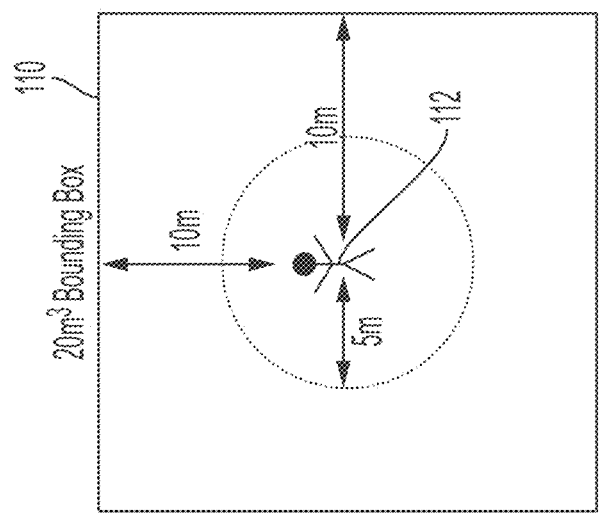
FIG. 7C is a schematic diagram illustrating a perception range with respect to a reconstruction range at a single position, according to some embodiments.
Figure 7B:
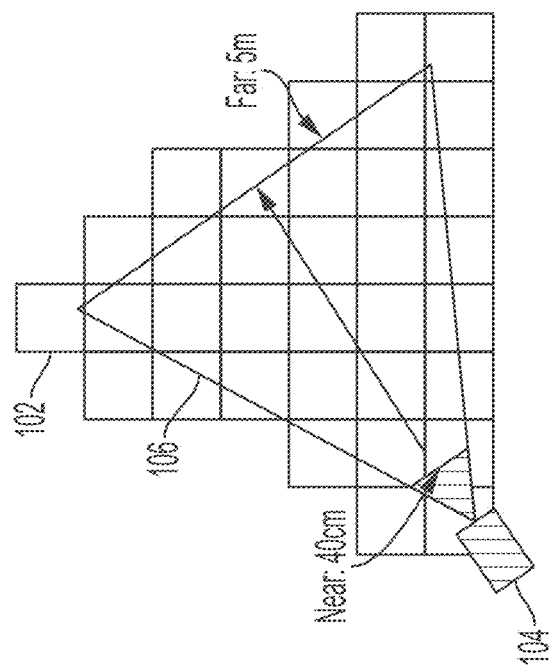
FIG. 7B is a schematic diagram illustrating a reconstruction range with respect to a single viewpoint, according to some embodiments.
Figure 7A:
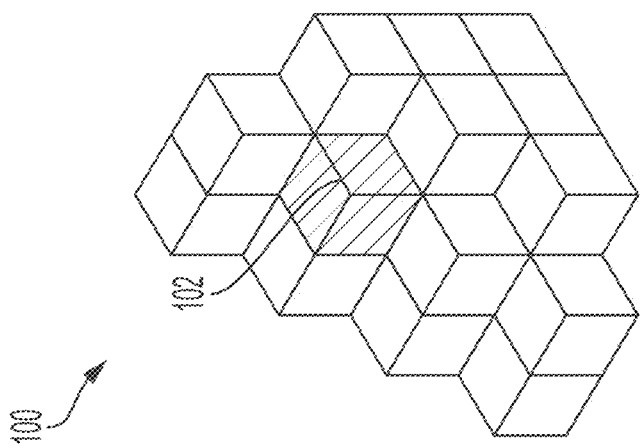
FIG. 7A is a schematic diagram illustrating a 3D space discretized into voxels, according to some embodiments.

FIG. 7A depicts an example of a 3D space 100 discretized into voxels 102. In some embodiments, the perception module 160 may determine objects of interest and set the volume of a voxel in order to capture features of the objects of interest and avoid redundant information. For example, the perception module 160 may be configured to identify larger objects and surfaces, such as walls, ceilings, floors, and large furniture. Accordingly, a volume of a voxel may be set to a relatively large size, for example, a cube of 4 cm$^3$.

Figure 8E:
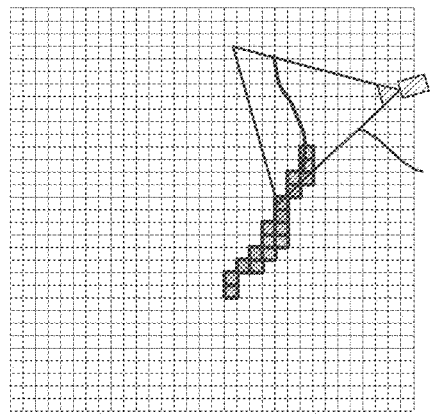
FIGS. 8A-F are schematic diagrams illustrating reconstructing a surface in a physical world into a voxel model by an image sensor viewing the surface from multiple positions and viewpoints, according to some embodiments.
Figure 8F:
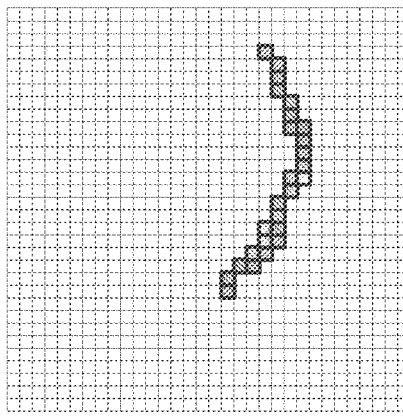

A reconstruction of a physical world including voxels may be referred to as a volumetric model. Information to create a volumetric model may be created over time as the sensors move about the physical world. Such motion may happen as the user of a wearable device including the sensors moves around. FIGS. 8A-F depict an example of reconstructing a physical world into a volumetric model. In the illustrated example, the physical world includes a portion 180 of a surface which is shown in FIG. 8A. In FIG. 8A, a sensor 182 at a first location may have a field of view 184, within which the portion 180 of the surface is visible.

The sensor 182 may be of any suitable type, such as a depth sensor. However, depth data may be derived from an image sensor(s) or in other ways. The perception module 160 may receive data from the sensor 182, and then set the values of multiple voxels 186 as illustrated in FIG. 8B to represent the portion 180 of the surface visible by the sensor 182 in the field of view 184.

Figure 8C:
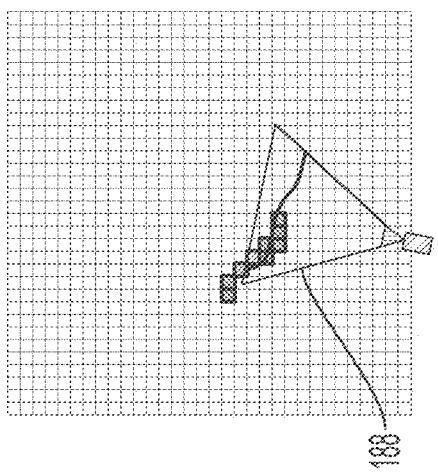
Figure 8D:
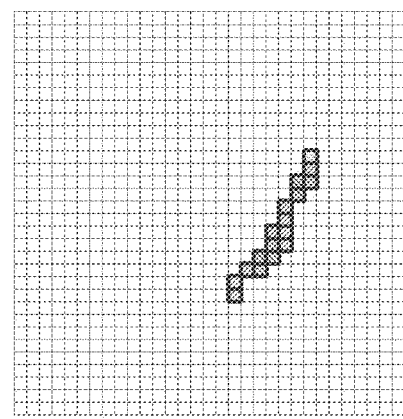
Figure 8A:
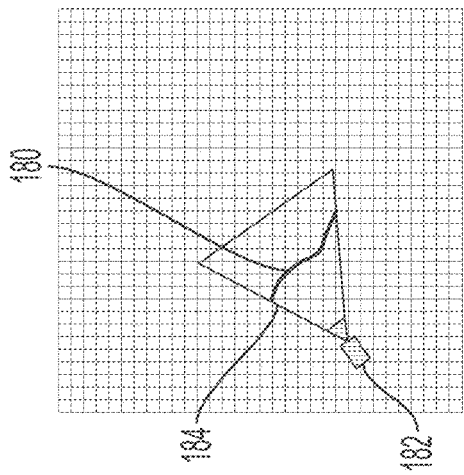
Figure 8B:
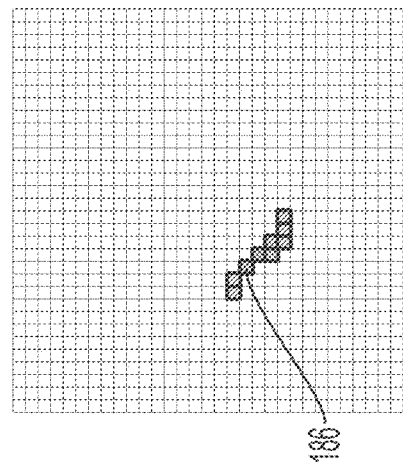

In FIG. 8C, the sensor 182 may move to a second location and have a field of view 188. As shown in FIG. 8D, a further group of voxels become visible, and the values of these voxels may be set to indicate the location of the portion of the surface that has entered the field of view 188 of sensor 182. The values of these voxels may be added to the volumetric model for the surface.

In FIG. 8E, the sensor 182 may further move to a third location and have a field of view 190. In the illustrated example, additional portions of the surface becomes visible in the field of view 190. As shown in FIG. 8F, a further group of voxels may become visible, and the values of these voxels may be set to indicate the location of the portion of the surface that has entered the field of view 190 of the sensor 182. The values of these voxels may be added to the volumetric model for the surface. As shown in FIG. 6, this information may be stored as part of the persisted world as volumetric information 162a. Information about the surfaces may also be stored, such as color or texture. Such information may be stored, for example, as volumetric metadata 162b.

In addition to generating information for a persisted world representation, the perception module 160 may identify and output indications of changes in a region around a user of a AR system. Indications of such changes may trigger updates to volumetric data stored as part of the persisted world, or trigger other functions, such as triggering components 304 that generate AR content to update the AR content.

In some embodiments, the perception module 160 may identify changes based on a signed distance function (SDF) model. The perception module 160 may be configured to receive sensor data such as, for example, depth maps 160a and headposes 160b, and then fuse the sensor data into a SDF model 160c. Depth maps 160a may provide SDF information directly, and images may be processed to arrive at SDF information. The SDF information represents distance from the sensors used to capture that information. As those sensors may be part of a wearable unit, the SDF information may represent the physical world from the perspective of wearable unit and therefore the perspective of the user. The headposes 160b may enable the SDF information to be related to a voxel in the physical world.

Referring back to FIG. 6, in some embodiments, the perception module 160 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may be operate reliably over a range of distances, creating the observation range of the sensor, which may be from a few centimeters or tens of centimeters to a few meters.

FIG. 7B depicts a reconstruction range with respect to a sensor 104 having a viewpoint 106. A reconstruction of 3D spaces within the viewpoint 106 may be built based on data captured by the sensor 104. In the illustrated example, the sensor 104 has an observation range of 40 cm to 5 m. In some embodiments, a sensor's reconstruction range may be determined to be smaller than the observation range of the sensor because sensor outputs close to its observation limits may be more noisy, incomplete, and inaccurate. For example, in the illustrated example of 40 cm to 5 m, a corresponding reconstruction range may be set to be from 1 to 3 m, and data collected with the sensor indicating surfaces outside this range may not be used.

In some embodiments, the perception range may be larger than a sensor's reconstruction range. If components 164 that use data about the physical world require data about regions within the perception range that are outside the portions of the physical world that are within the current reconstruction range, that information may be provided from the persisted world 162. Accordingly, information about the physical world may be readily accessible by a query. In some embodiments, an API may be provided to respond to such a query, providing information about the current perception range of the user. Such technique may reduce time needed to access an existing reconstruction and provide an improved user experience.

In some embodiments, the perception range may be a 3D space corresponding to a bounding box centered around a user location. As the user moves, the portion of the physical world within the perception range, which may be queriable by the components 164, may move with the user. FIG. 7C depicts a bounding box 110 centered around a location 112. It should be appreciated that the size of the bounding box 110 may be set to enclose a sensor's observation range with reasonable extensions because a user cannot move at an unreasonable speed. In the illustrated example, a sensor worn by the user has an observation limit of 5 m. The bounding box 110 is set as a cube of 20 m³.

Referring back to FIG. 6, the world reconstruction component 316 may include additional modules that may interact with the perception module 160. In some embodiments, a persisted world module 162 may receive representations for the physical world based on data acquired by the perception module 160. The persisted world module 162 also may include various formats of representations of the physical world. For example, volumetric metadata 162b such as voxels may be stored as well as meshes 162c and planes 162d. In some embodiments, other information, such as depth maps could be saved.

In some embodiments, the perception module 160 may include modules that generate representations for the physical world in various formats including, for example, meshes 160d, planes and semantics 160e. These modules may generate representations based on data within the perception range of one or more sensors at the time the representation is generated as well as data captured at prior times and information in the persisted world 162. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 160 detects a change in the physical world in that subregion. Such a change, for example, may be detected by detecting a new surface in the SDF model 160c or other criteria, such as changing the value of a sufficient number of voxels representing the subregion.

The world reconstruction component 316 may include components 164 that may receive representations of the physical world from the perception module 160. Information about the physical world may be pulled by these components according to, for example, a use request from an application. In some embodiments, information may be pushed to the use components, such as via an indication of a change in a pre-identified region or a change of the physical world representation within the perception range. The components 164, may include, for example, game programs and other components that perform processing for visual occlusion, physics-based interactions, and environment reasoning.

Responding to the queries from the components 164, the perception module 160 may send representations for the physical world in one or more formats. For example, when the component 164 indicates that the use is for visual occlusion or physics-based interactions, the perception module 160 may send a representation of surfaces. When the component 164 indicates that the use is for environmental reasoning, the perception module 160 may send meshes, planes and semantics of the physical world.

In some embodiments, the perception module 160 may include components that format information to provide the component 164. An example of such a component may be raycasting component 160f. A use component (e.g., component 164), for example, may query for information about the physical world from a particular point of view. Raycasting component 160f may select from one or more representations of the physical world data within a field of view from that point of view.

As should be appreciated from the foregoing description, the perception module 160, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting and updating 3D reconstruction data in blocks that allow local update while maintaining neighbor consistency, providing occlusion data to applications generating such scenes, where the occlusion data is derived from a combination of one or more depth data sources, and/or performing a multi-stage mesh simplification.

A world reconstruction system may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction. The reconstruction may be more complete and less noisy than the original sensor data by using spatial and temporal averaging (i.e. averaging data from multiple viewpoints over time).

The reconstruction may contain data of different levels of sophistication including, for example, raw data such as live depth data, fused volumetric data such as voxels, and computed data such as meshes.

In some embodiments, AR and MR systems represent a 3D scene with a regular voxel grid, where each voxel may contain a signed distance field (SDF) value. The SDF value describes whether the voxel lies inside or outside a surface in the scene to be reconstructed and a distance from the voxel to the surface. Computing the 3D reconstruction data, representing the desired volume of the scene, requires a large amount of memory and processing power. These requirements increase for scenes that represents larger spaces as the number of variables required for the 3D reconstruction grows cubically with the number of depth images processed.

Described herein is an efficient way of reducing processing. In accordance with some embodiments, a scene may be represented by one or more bricks. Each brick may include multiple voxels. The bricks processed to generate the 3D reconstruction of the scene may be selected by culling the set of bricks representing the scene based on a frustum derived from the field-of-view (FOV) of an image sensor, and/or a depth image (or "depth map") of the scene created with a depth sensor.

The depth image may have one or more pixels, each representing a distance to a surface in the scene. These distances can be related to a position relative to an image sensor, such that the data output from the image sensor may be selectively processed. Image data may be processed for those bricks representing portions of the 3D scene that contain surfaces that would be visible from the point of view (or "viewpoint") of the image sensor. Processing of some or all of the remaining bricks may be omitted. With such an approach, the selected bricks may be ones that are likely to contain new information, which may be arrived at by culling bricks about which the output of the image sensor is unlikely to provide useful information. The data output from the image sensor is unlikely to provide useful information about bricks that are either closer to or further from the image sensor than a surface indicated by the depth map because those bricks are either empty space or behind a surface and therefore not depicted in images from the image sensor.

Figure 9:
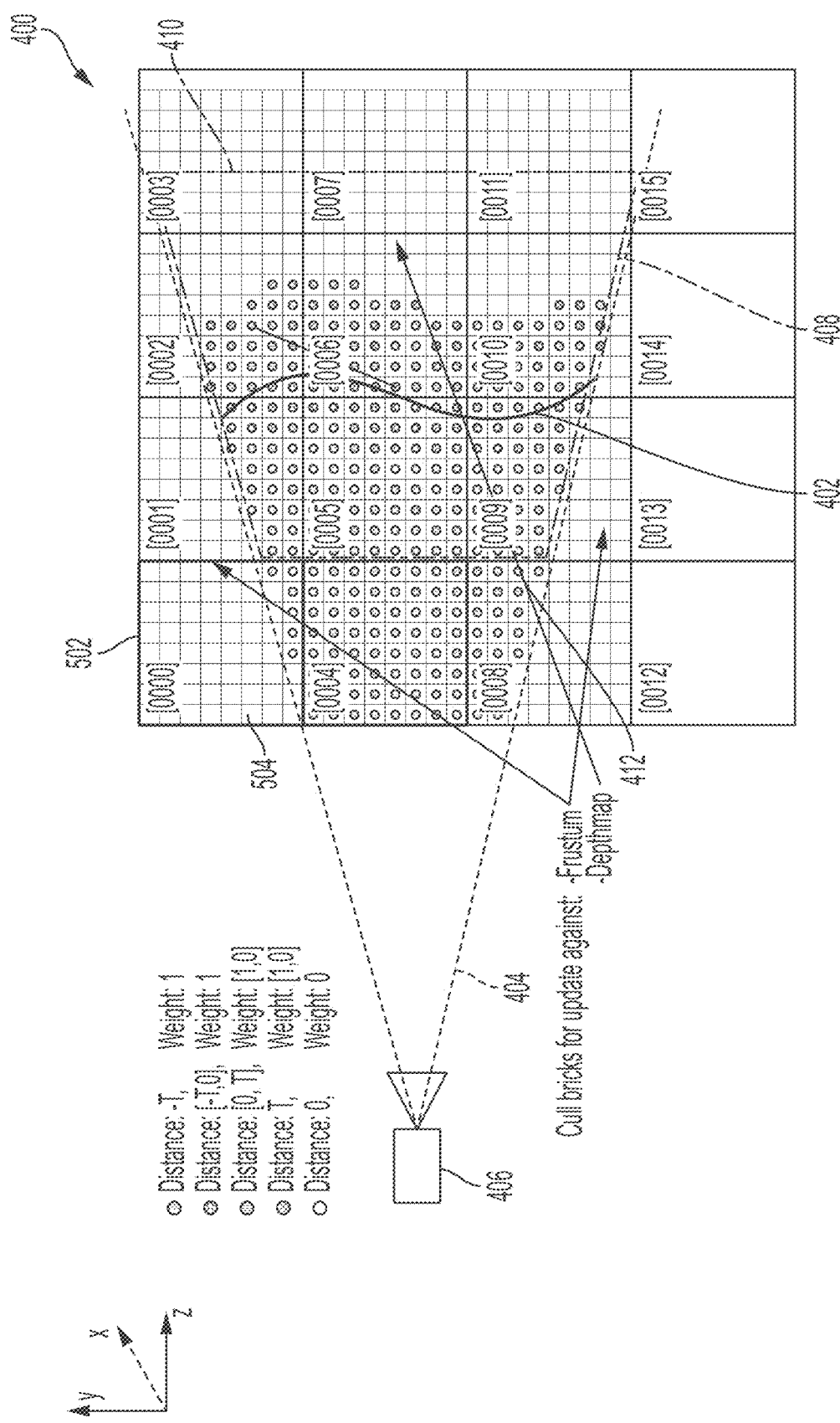
FIG. 9 is a schematic diagram illustrating a scene represented by bricks comprising voxels, a surface in the scene, and a depth sensor capturing the surface in a depth image, according to some embodiments.

FIG. 9 shows a cross-sectional view of a scene 400 along a plane parallel to y-coordinate and z-coordinate. An XR system may represent the scene 400 by a grid of voxels 504. Conventional XR systems may update each voxel of the grid of voxels based on every new depth image captured by a sensor 406, which may be an image sensor or depth sensor, such that a 3D reconstruction generated from the grid of voxels can reflect changes in the scene. Updating in this fashion may consume significant computing resources and also cause artifacts at the output of an XR system due to, for example, time latency caused by heavy computing.

Described herein are techniques of providing accurate 3D reconstructed data with low usage of computational resources, for example, by culling parts of the grid of voxels 504 based at last in part on a camera frustum 404 of an image sensor 406 and/or depth image captured by the image sensor.

In the illustrated example, the image sensor 406 captures a depth image (not shown) including a surface 402 of the scene 400. The depth image may be stored in computer memory in any convenient way that captures distance between some reference point and surfaces in the scene 400. In some embodiments, the depth image may be represented as values in a plane parallel to an x-axis and y-axis, as illustrated in FIG. 9, with the reference point being the origin of the coordinate system. Locations in the X-Y plane may correspond to directions relative to the reference point and values at those pixel locations may indicate distance from the reference point to the nearest surface in the direction indicated by the coordinate in the plane. Such a depth image may include a grid of pixels (not shown) in the plane parallel to the x-axis and y-axis. Each pixel may indicate a distance, in a particular direction, from the image sensor 406 to the surface 402. In some embodiments, a depth sensor may be unable to measure a distance to a surface in a particular direction. Such a condition, for example, may result if the surface is out of range of the image sensor 406. In some embodiments, the depth sensor may be an active depth sensor, that measures distance based on reflected energy, but a surface may not reflect sufficient energy for an accurate measurement. Accordingly, in some embodiments, the depth image may have "holes," where there are pixels to which no value is assigned.

In some embodiments, the reference point of the depth image may change. Such a configuration may allow the depth image to represent surfaces throughout an entire 3D scene, not limited to the portions having a predetermined and limited range of angles with respect to a particular point of reference. In such embodiments, the depth image may indicate distance to surfaces as the image sensor 406 moves through six degree-of-freedom (6DOF). In these embodiments, the depth image may include a set of pixels for each of multiple reference points. In these embodiments, a portion of the depth image may be selected based on a "camera pose," representing the direction and/or orientation in which the image sensor 406 is pointing at the time image data is captured.

The image sensor 406 may have a field-of-view (FOV), which may be represented by the camera frustum 404. In some embodiments, the infinite camera frustum depicted may be reduced to a finite 3D trapezoidal prism 408 by assuming a maximum depth 410 that the image sensor 406 can provide, and/or a minimum depth 412 that the image sensor 406 can provide. The 3D trapezoidal prism 408 may be a convex polyhedron delimited by at six planes.

Figure 10B:
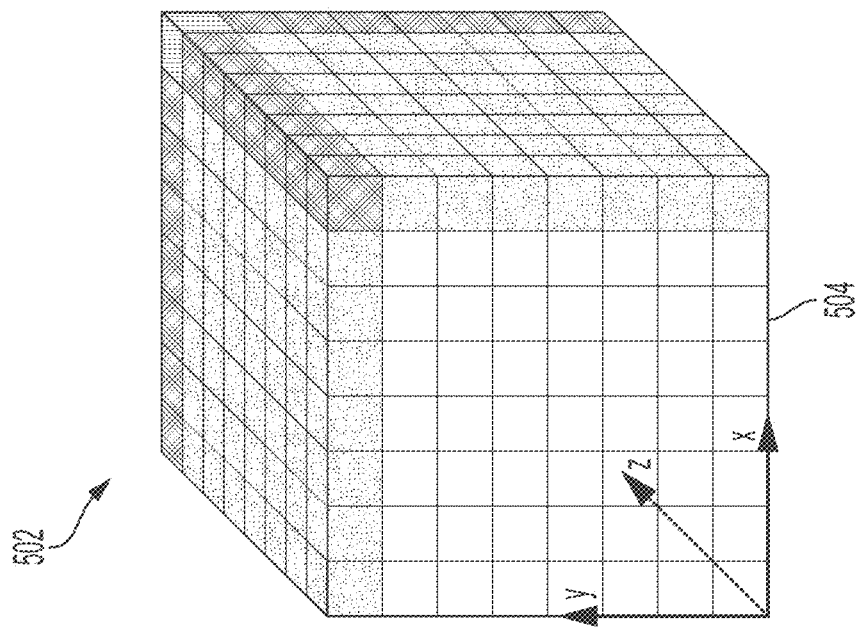
FIG. 10B is a schematic diagram illustrating a voxel grid in a brick of FIG. 10A.
Figure 10A:
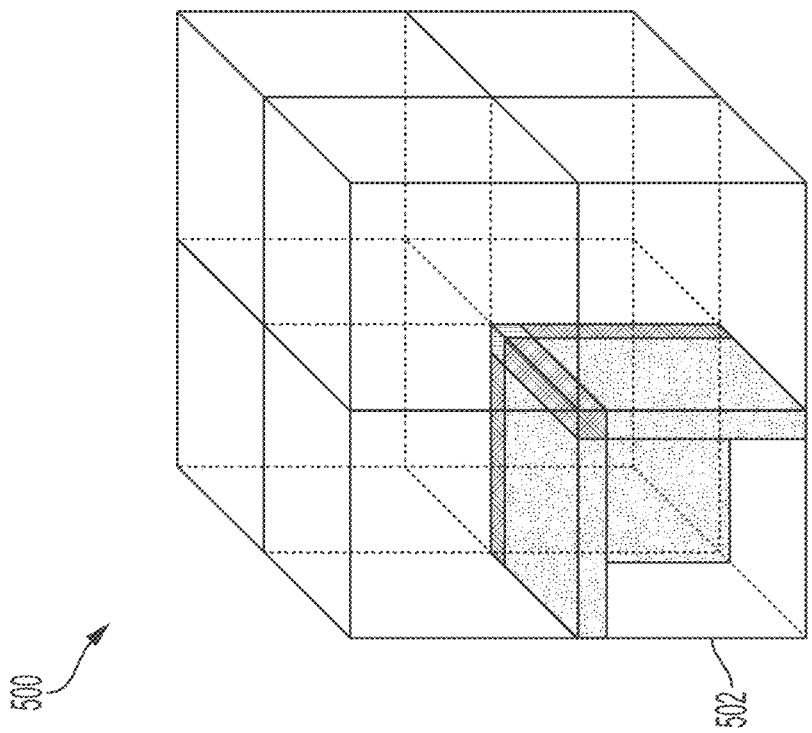
FIG. 10A is a schematic diagram illustrating a 3D space represented by eight bricks.

In some embodiments, one or more voxels 504 may be grouped into a brick 502. FIG. 10A illustrates a portion 500 of the scene 400, which includes eight bricks 502. FIG. 10B illustrates an exemplary brick 502 comprising $8^3$ voxels 504. Referring back to FIG. 9, the scene 400 may include one or more bricks, sixteen of which are illustrated in the view depicted in FIG. 4. Each brick may be identifiable by a brick identity, for example, [0000]-[0015].

A Geometry Extraction System

In some embodiments, a geometry extraction system may extract geometries while scanning a scene with cameras and/or sensors, which allows a fast, efficient extraction that can accommodate dynamic environment changes. In some embodiments, a geometry extraction system may persist extracted geometries in local and/or remote memories. The persisted geometries may be with unique identifications such that different queries, for example, at different timestamps and/or from different applications, can share the persisted geometries. In some embodiments, a geometry extraction system may support different representations of a geometry according to individual queries. Planes are used as an exemplary geometry in the following descriptions of FIGS. 11-19. It should be appreciated that a geometry extraction system may detect other geometries to use in subsequent processing instead of or in addition to planes, including, for example, cylinders, cubes, lines, corners, or semantics such as glass surfaces or holes. In some embodiments, the principles described herein with respect to geometry extraction may be applicable to object extraction and the like.

Figure 11:
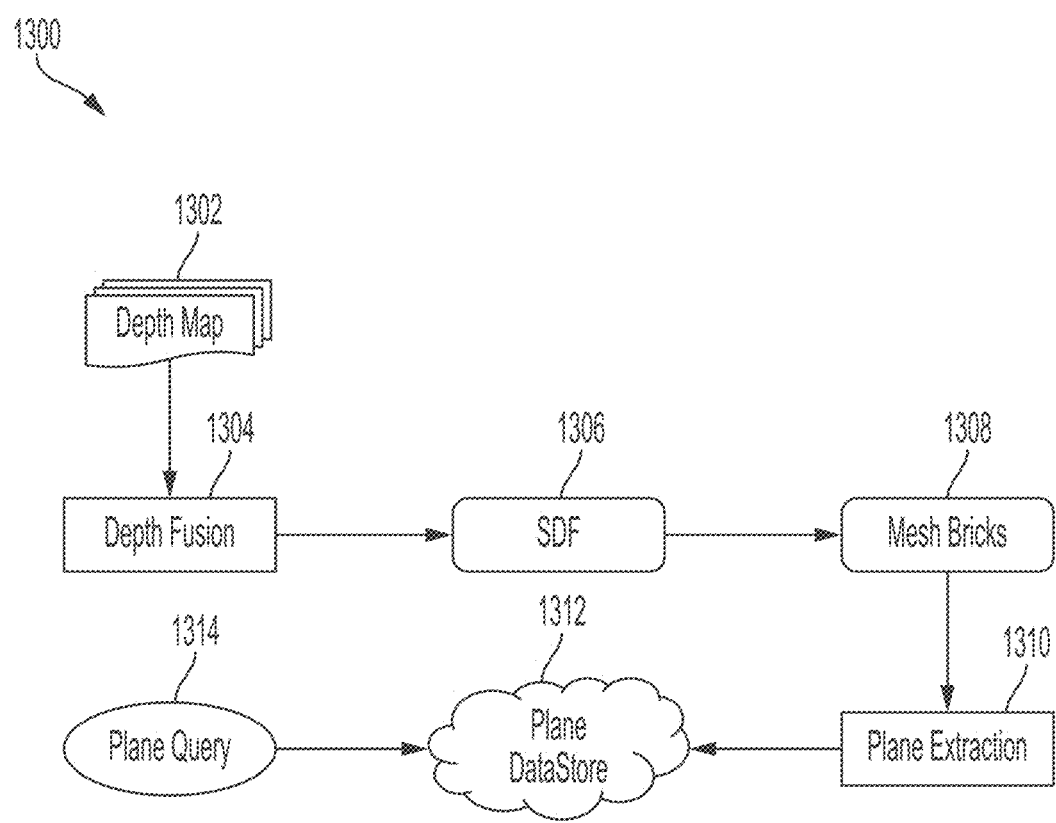
FIG. 11 is a schematic diagram illustrating a plane extraction system, according to some embodiments.

FIG. 11 shows a plane extraction system 1300, according to some embodiments. The plane extraction system 1300 may include depth fusion 1304, which may receive multiple depth maps 1302. The multiple depth maps 1302 may be created by one or more users wearing depth sensors, and/or downloaded from local/remote memories. The multiple depth maps 1302 may represent multiple views of a same surface. There may be differences between the multiple depth maps, which may be reconciled by the depth fusion 1304.

In some embodiments, the depth fusion 1304 may generate SDFs 1306. Mesh bricks 1308 may be extracted from the SDFs 1306 by, for example, applying a marching cube algorithm over corresponding bricks (e.g., bricks [0000]-[0015] in FIG. 13). Plane extraction 1310 may detect planar surfaces in the mesh bricks 1308 and extract planes based at least in part on the mesh bricks 1308. The plane extraction 1310 may also extract surfels for each brick based, at least in part, on corresponding mesh bricks. Surfels may include vertices in a mesh but not the edges connecting neighboring vertices such that storing surfels consumes less memory space than a mesh. A plane data store 1312 may persist the extracted planes and surfels.

In some embodiments, XR applications or other components 164 of the XR system may request and obtain planes from the plane data store 1312 by plane query 1314, which may be sent by application programming interfaces (APIs). For example, an application may send to a plane extraction system 1300 information about its position, and ask for all planes near it (e.g., within five meters radius). The plane extraction system 1300 may then searches its plane data store 1312, and send the selected planes to the application. The plane query 1314 may include information such as where the application needs a plane, what kind of plane the application needs, and/or how the plane should look like (e.g., horizontal or vertical or angled, which may be determined by checking primitive normals of the planes in the plane data store).

Figure 12:
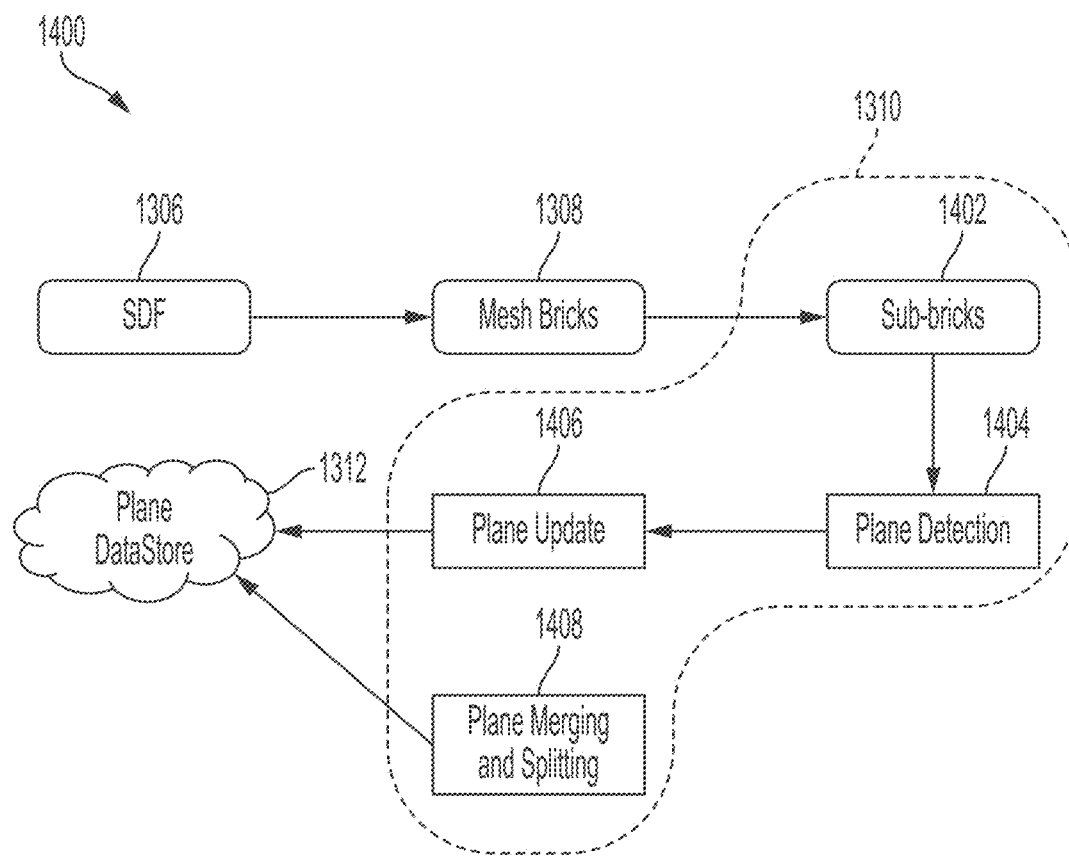
FIG. 12 is a schematic diagram illustrating portions of the plane extraction system of FIG. 11 with details on Plane Extraction, according to some embodiments.

FIG. 12 shows portions 1400 of the plane extraction system 1300, illustrating details on plane extraction 1310, according to some embodiments. The plane extraction 1310 may include dividing each of the mesh bricks 1308 into sub-bricks 1402. Plane detection 1404 may be conducted for each of the sub-bricks 1402. For example, plane detection 1404 may compare primitive normals of each mesh triangle in a sub-brick; merge those mesh triangles, with primitive normal differences smaller than a predetermined threshold value, into one mesh triangle; and identify a mesh triangle with an area larger than a predetermined area value as a plane.

Figure 13:
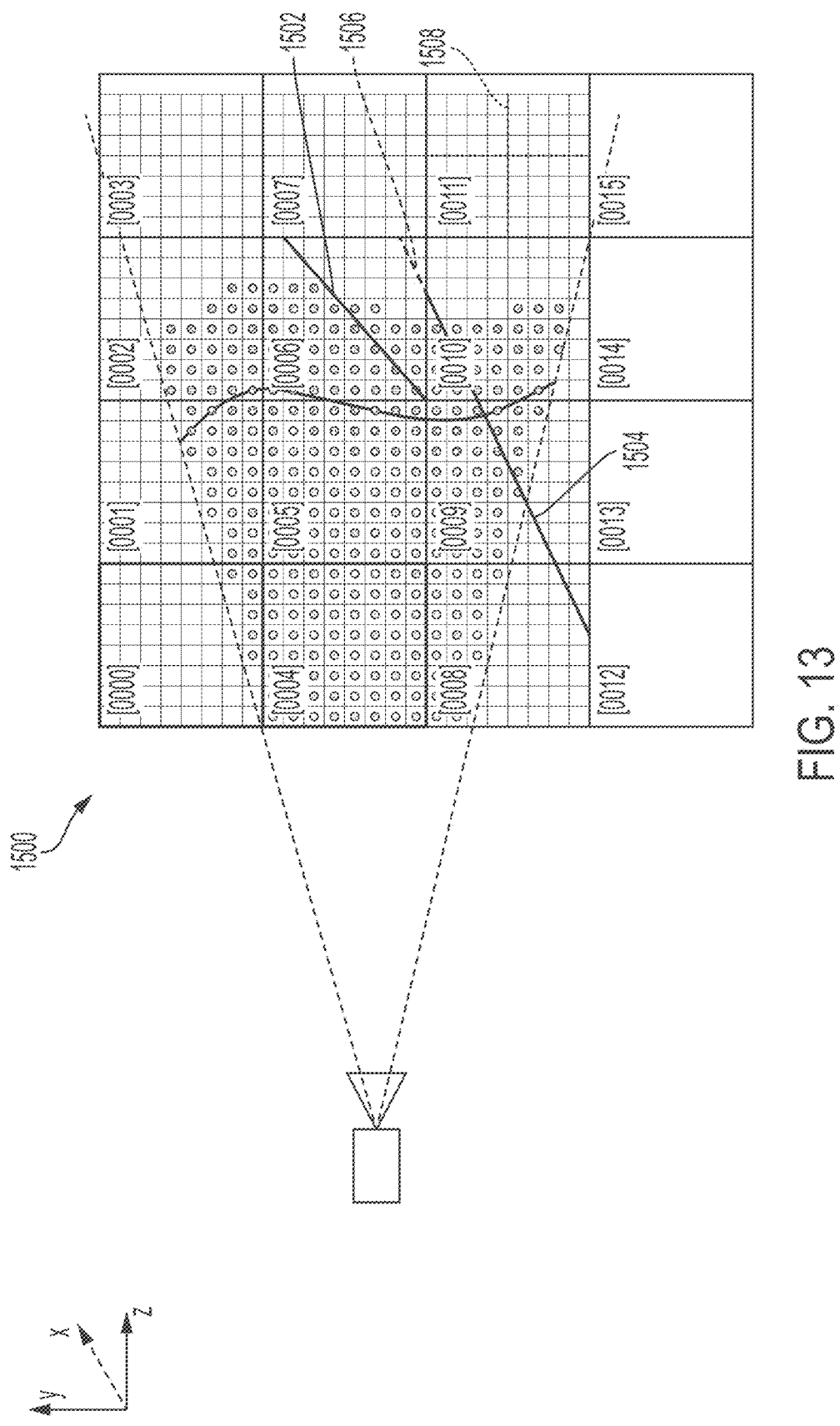
FIG. 13 is a schematic diagram illustrating a scene represented by bricks comprising voxels, and exemplary plane data in the scene, according to some embodiments.

FIG. 13 is a schematic diagram illustrating a scene 1500 represented by bricks [0000]-[0015] including voxels, and exemplary plane data including a brick plane 1502, global plane 1504, and surfel 1506 in the scene, according to some embodiments. FIG. 13 illustrates a brick [0011] being divided into four sub-brick 1508. It should be appreciated that a mesh brick may be divided into any suitable number of sub-bricks. The granularity of a plane detected by plane detection 1404 may be determined by the size of a sub-brick, while the size of a brick may be determined by the granularity of local/remote memories that stores the volumetric 3D reconstruction data.

Referring back to FIG. 12, the plane detection 1404 may determine a brick plane (e.g., brick plane 1502) for each mesh brick based, at least in part, on the detected planes for each sub-bricks in the mesh brick. The plane detection 1404 may also determine global planes that extend more than one bricks (e.g., global plane 1504).

In some embodiments, the plane extraction 1310 may include plane update 1406, which may update existing brick planes and/or global planes stored in the plane data store 1312 based, at least in part, on the planes detected by plane detection 1404. The plane update 1406 may include adding additional brick planes, removing some of the existing brick planes, and/or replacing some of the existing brick planes with brick planes detected by the plane detection 1404 and corresponding to the same bricks such that real-time changes in the scene are persisted in the plane data store 1312. The plane update 1406 may also include aggregating a brick plane detected by the plane detection 1404 to an existing global plane, for example, when a brick plane is detected adjacent to an existing global plane.

In some embodiments, plane extraction 1310 may further include plane merging and splitting 1408. The plane merging may merge multiple global planes into one big global plane, for example, when a brick plane is added and connects two global planes. Plane splitting may split one global plane into multiple global planes, for example, when a brick plane in the middle of a global plane is removed.

Figure 14:
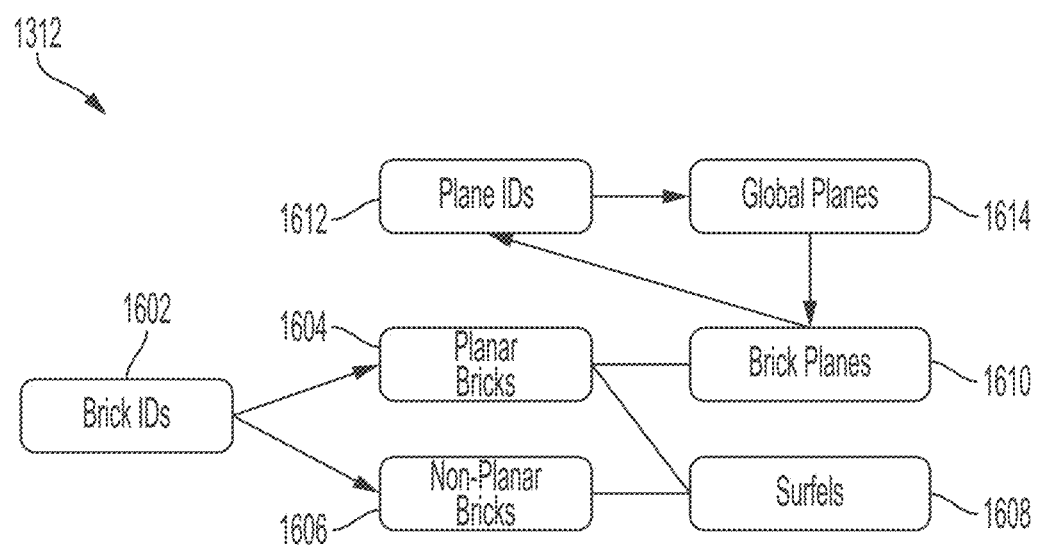
FIG. 14 is a schematic diagram illustrating Plane Data Store of FIG. 11, according to some embodiments.

FIG. 14 shows data structure in a plane data store 1312, according to some embodiments. Global planes 1614 indexed by plane IDs 1612 may be at the highest level of the data structure. Each global plane 1614 may include multiple brick planes and surfels of bricks adjacent to corresponding global planes, such that one brick plane may be persisted for each brick while a global plane can be accurately presented when edges of the global plane is not qualified as brick planes for corresponding bricks. In some embodiments, surfels of bricks adjacent to a global plane are persisted instead of surfels of all bricks in a scene since it would be sufficient for accurately presenting a global plane. For example, as illustrated in FIG. 13, the global plane 1504 extends across brick [0008]-[0010] and [0006]. The brick [0006] has the brick plane 1502, which is not part of the global plane 1504. With the data structure in the plane data store 1312, when a plane query requests the global plane 1504, surfels of bricks [0006] and [0012] are checked to determine whether the global plane 1504 extends into the bricks [0006] and [0012]. In the illustrated example, surfels 1506 indicates that the global plane 1504 extends into the brick [0006].

Referring back to FIG. 14, the global planes 1614 may be bi-directionally associated with corresponding brick planes 1610. Bricks may be identifiable by brick IDs 1602. Bricks may be divided into planar bricks 1604, which include at least one plane, and non-planar bricks 1606, which include no planes. Surfels for both planar bricks and non-planar bricks may be persisted, depending on whether a brick is adjacent a global plane but not whether the brick includes planes. It should be appreciated that planes may be continuously persisted in the plane data store 1312 while an XR system is observing a scene, regardless of whether or not there is a plane query 1314.

Figure 15:
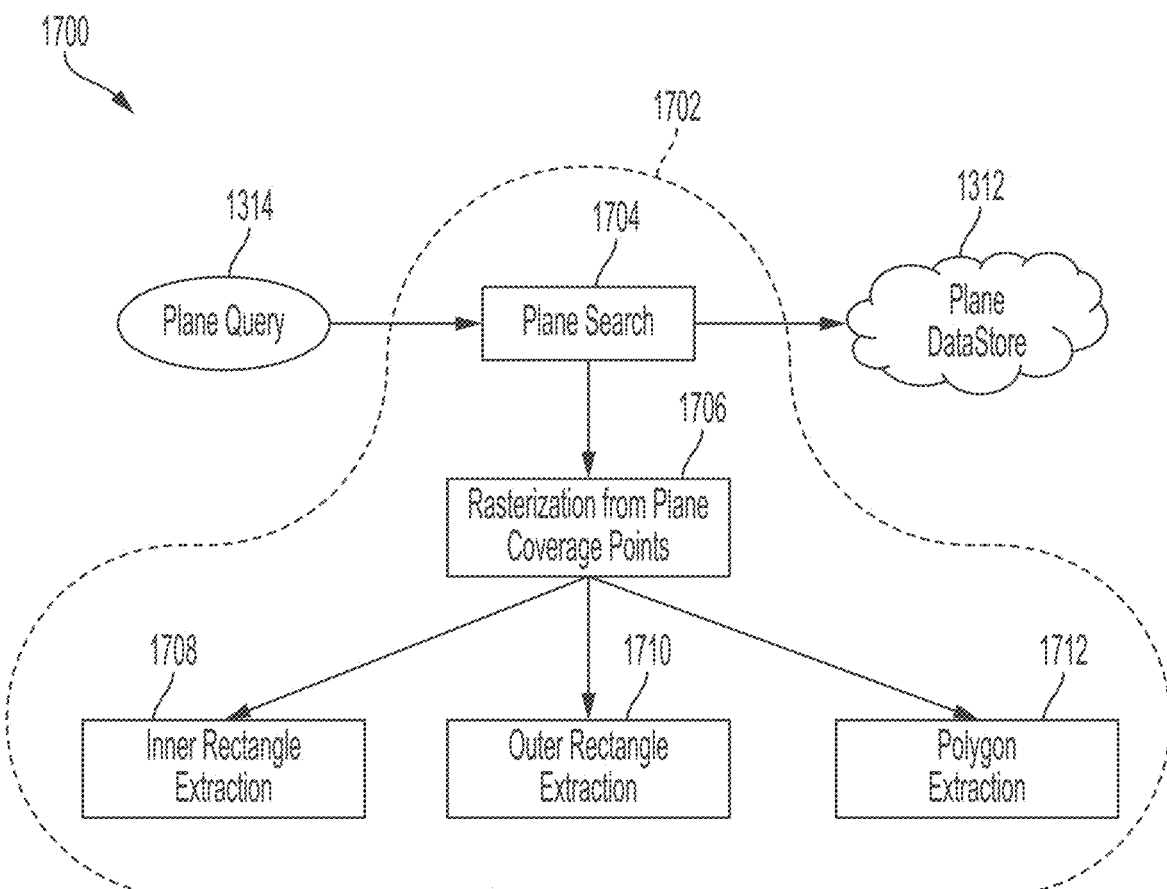
FIG. 15 is a schematic diagram illustrating Planar Geometry Extraction when a Plane Query is sent to a Plane Data Store of FIG. 11, according to some embodiments.

FIG. 15 shows planar geometry extraction 1702, which may extract planes for an application's usage, when the application sends the plane query 1314 to a plane data store 1312, according to some embodiments. The planar geometry extraction 1702 may be implemented as an API. The plane query 1314 may indicate requested planar geometry representation, for example, outer rectangular planes, inner rectangular planes, or polygon planes. According to the plane query 1314, plane search 1704 may search and obtain plane data in the plane data store 1312.

In some embodiments, rasterization from plane coverage points 1706 may generate plane coverage points. An example is illustrated in FIG. 16A. There are four bricks [0000]-[0003], each has a brick plane 1802. Plane coverage points 1806 (or "rasterized points") are generated by projecting boundary points of the brick planes onto a global plane 1804.

Referring back to FIG. 15, rasterization from plane coverage points 1706 may also generate a rasterized plane mask from the plane coverage points. According to the requested planar geometry representation by the plane query 1314, inner rectangular plane representation, outer rectangular plane representation, and polygon plane representation may be extracted by inner rectangle extraction 1708, outer rectangle extraction 1710, and polygon extraction 1712, respectively. In some embodiments, an application can receive the requested planar geometry representation within milliseconds from sending a plane query.

Figure 16B:
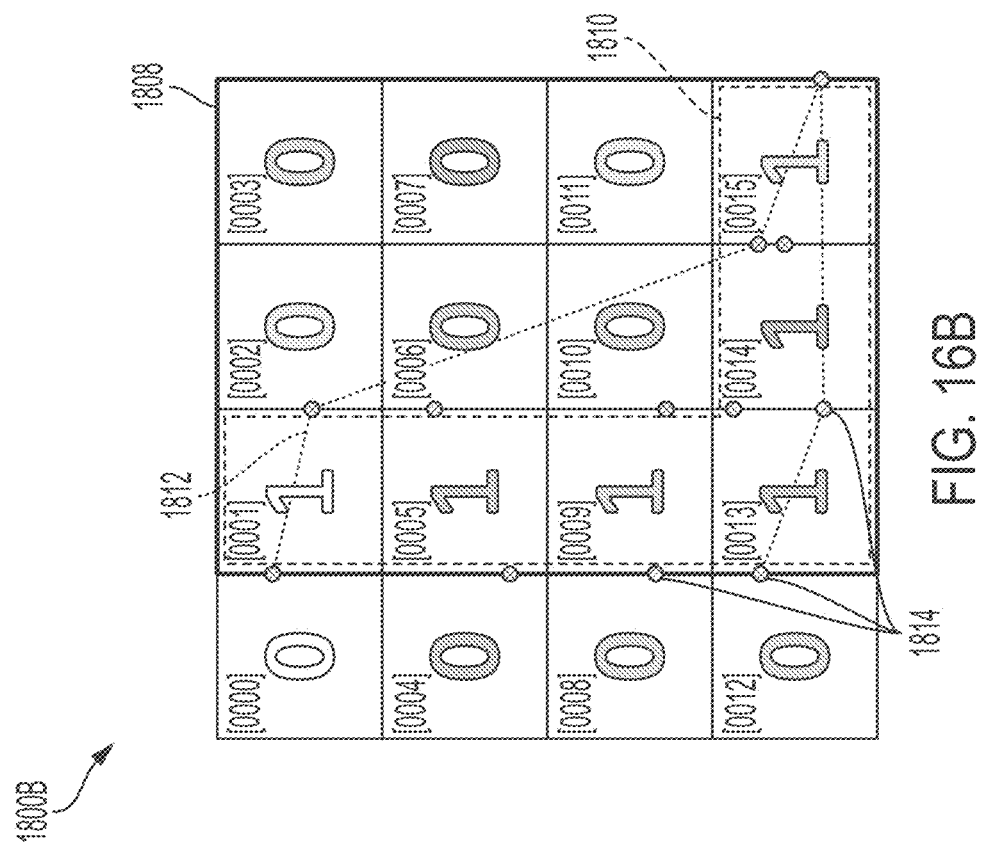
FIG. 16B is a schematic diagram illustrating various exemplary planar geometry representations, which may be extracted from an exemplary rasterized plane mask, according to some embodiments.
Figure 16A:
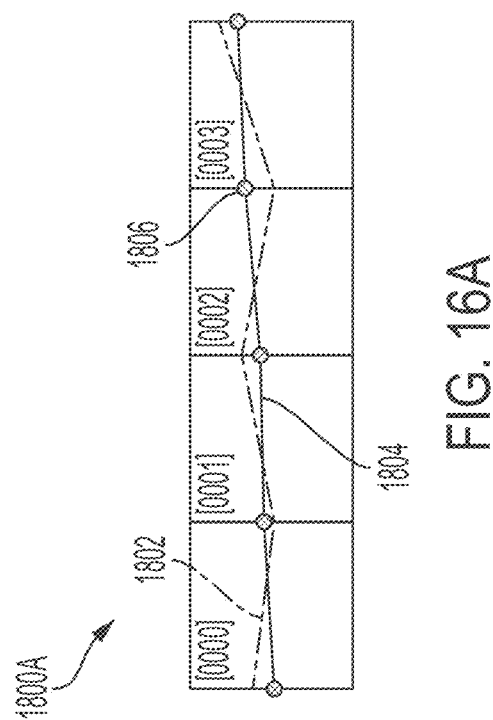
FIG. 16A is a schematic diagram illustrating generating Plane Coverage Points of FIG. 15, according to some embodiments.

An exemplary rasterized plane mask 1814 is illustrated in FIG. 16B. From a rasterized plane mask, various planar geometry representations may be generated. In the illustrated example, a polygon 1812 is generated by connecting some of the plane coverage points of the rasterized plane mask such that none of the plane coverage pints in the mask is outside the polygon. An outer rectangle 1808 is generated such that the outer rectangle 1808 is the smallest rectangle surrounding the rasterized plane mask 1814. Inner rectangles 1810 are generated by assigning "1"s to bricks with two plane coverage points and "0"s to bricks without two plane coverage points to form a rasterized grid, determining groups of brick that are marked as "1" and aligned in a line parallel to an edge of a brick (e.g., bricks [0001], [0005], [0009], and [0013] as a group, bricks [0013]-[0015] as a group), and generating one inner rectangle for each determined group such that the inner rectangle is the smallest rectangle surrounding the respective group.

Figure 17:
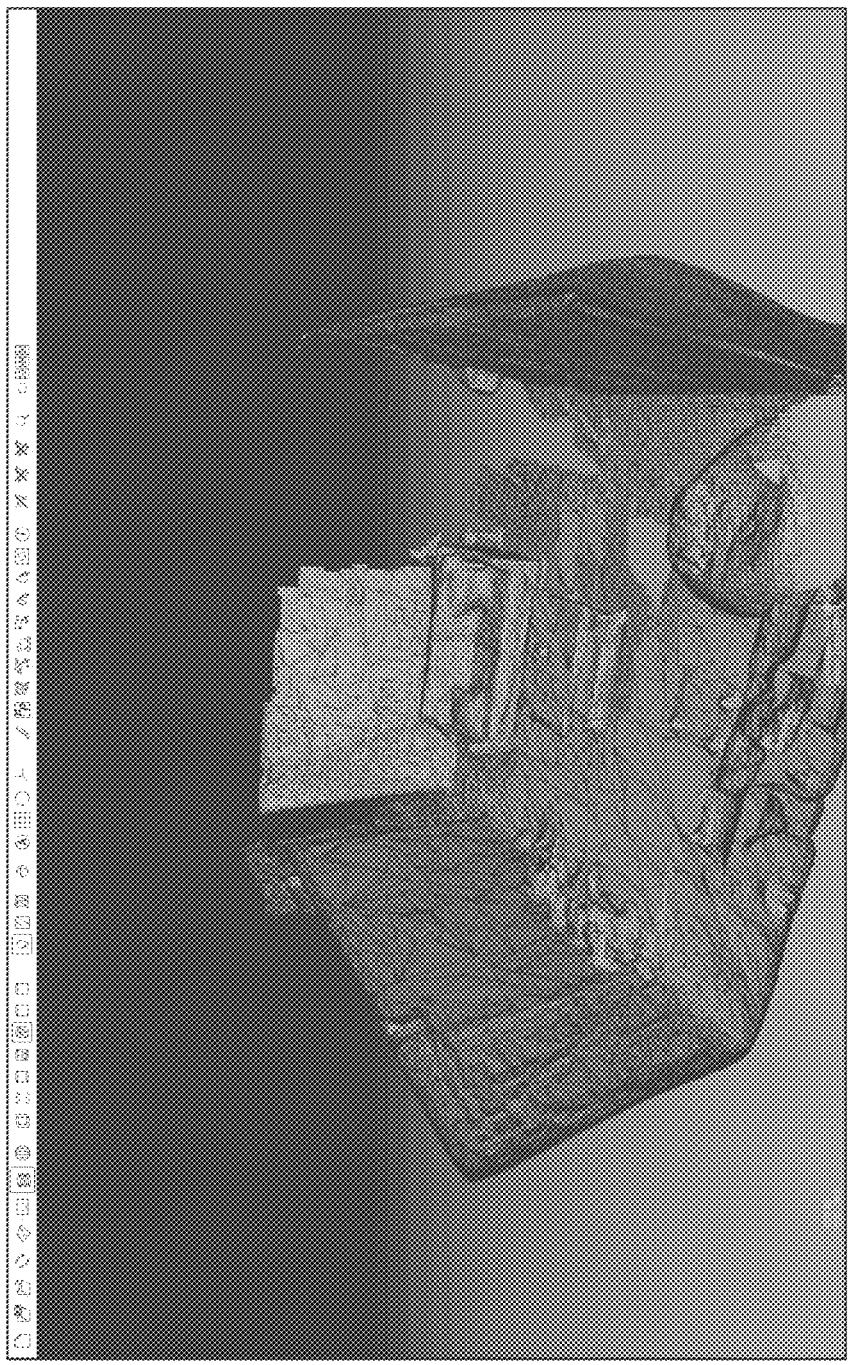
FIG. 17 shows a mesh for a scene, according to some embodiments.
Figure 18A:
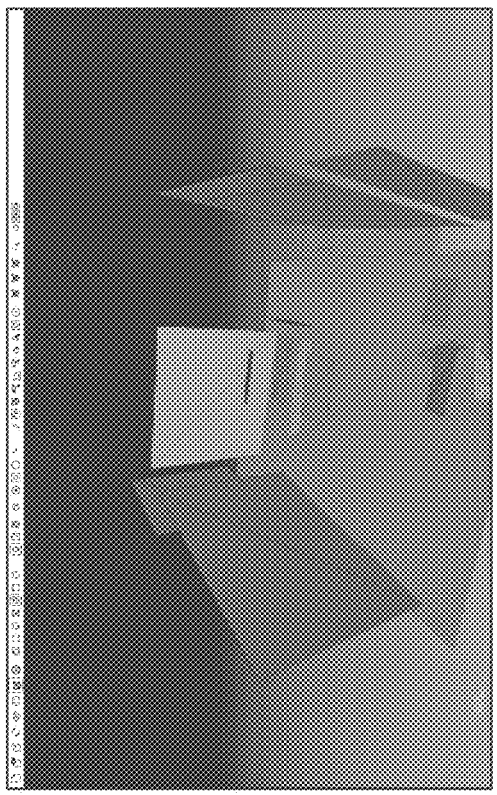
FIG. 18A shows the scene of FIG. 17 represented by outer rectangular planes, according to some embodiments.
Figure 18B:
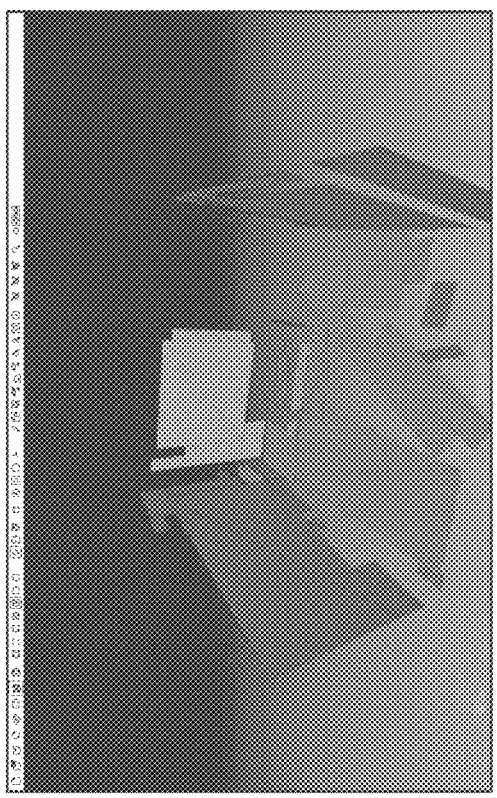
FIG. 18B shows the scene of FIG. 17 represented by inner rectangular planes, according to some embodiments.
Figure 18C:
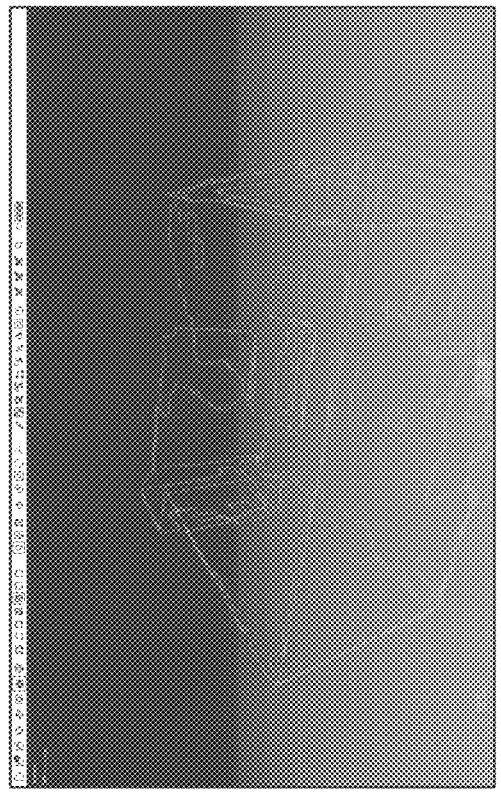
FIG. 18C shows the scene of FIG. 17 represented by polygon planes, according to some embodiments.

FIG. 17 shows a mesh for a scene 1900, according to some embodiments. FIGS. 18A-C show the scene 1900 represented by outer rectangular planes, inner rectangular planes, and polygon planes, respectively, according to some embodiments.

Figure 19:
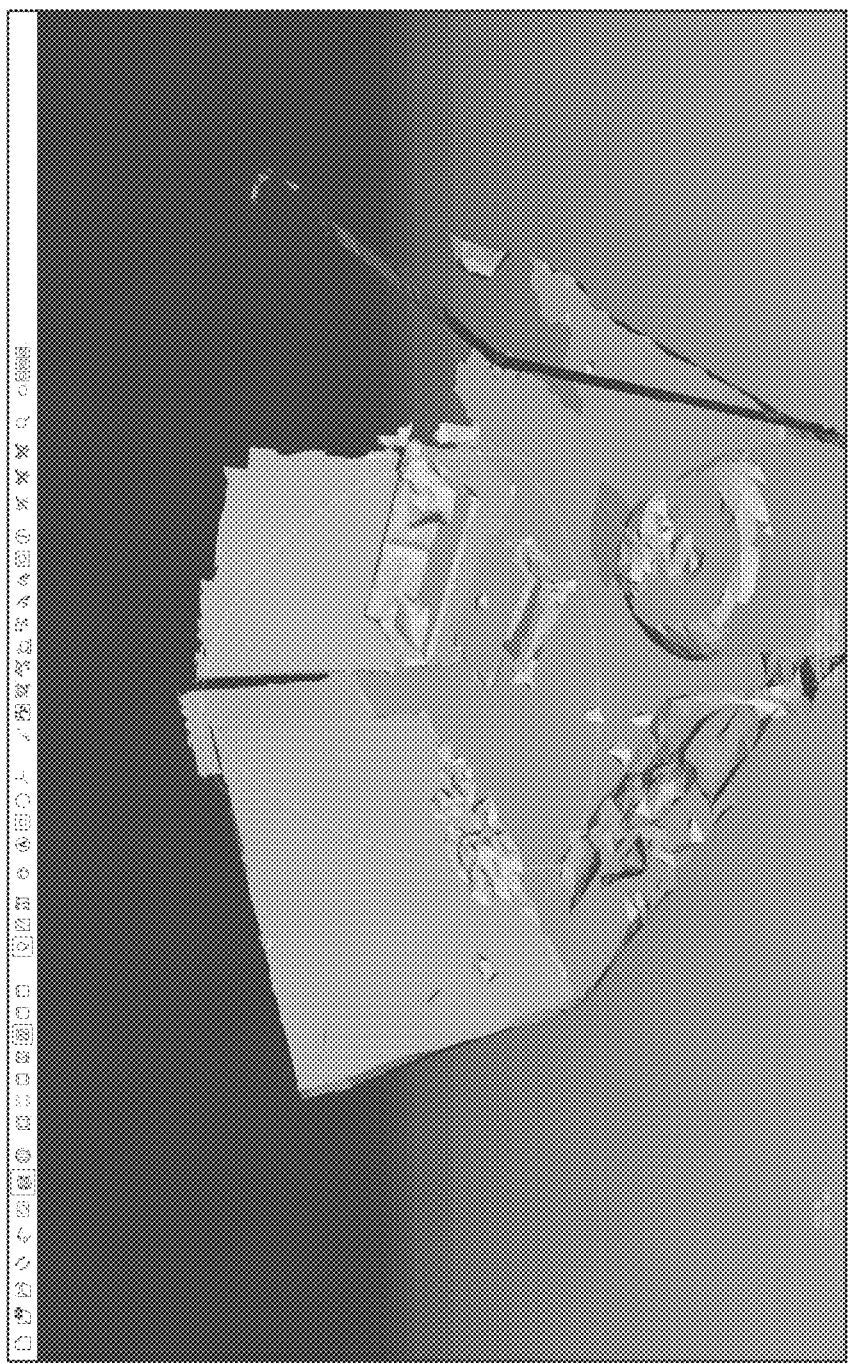
FIG. 19 shows the scene of FIG. 17 with denoised mesh by planarizing the mesh shown in FIG. 17, according to some embodiments.

FIG. 19 illustrated a less noisy 3D representation of the scene 1900, which is obtained by planarizing the mesh shown in FIG. 17 based on extracted plane data, for example, planes illustrated in FIGS. 18A-C.

Environment Reconstruction

In some embodiments, a portion of an environment, such as an indoor environment, may be represented by a set of corner points, with or without metadata about those points or the surfaces that they bound. Techniques for simply representing a portion of an environment as described herein may be implemented by perception module 160 (FIG. 6) or any other suitable component. Such information describing that representation may be stored as part of a persisted world model 162 instead of or in addition to a dense mesh or other representation as described above. Alternatively or additionally, those corner points may be converted to a format that mimics a representation computed with other techniques as described above. As a specific example, the representation of an environment as a set of corner points may be converted to a simple mesh and stored as a mesh 162c. Alternatively or additionally, each of the walls identified may be stored as a plane 162d.

When a component 164 requires information about a portion of the physical world for which such a representation is stored, that component 164 may obtain that representation using calls to the perception module 160 or access the persisted world model 162 in any other suitable way. In some embodiments, that representation may be provided whenever information about that portion of the physical world is requested. In some embodiments, a component 164 requesting information may specify that a simple representation is suitable or requested. An application, for example, may call into the persisted world model 162 using a parameter indicating that a simplified representation of the physical world is suitable or requested.

The corner points may be determined from surface planes representing surfaces, such as walls, floors and/or ceilings, in the environment. The surface planes may be derived from data collected with sensors on a wearable or other component in an XR system. The data may represent plane segments, which may correspond to portions of a wall or other surfaces that are detected from processing an image, distance or other sensor data as described above.

In some embodiments, an environment, such as an indoor environment, may be reconstructed by identifying surface planes of the environment based on plane segments. In some embodiments, a plane segment may be represented by three or more points that bound a flat surface. A plane segment normal may be computed for the plane segment. As a specific example, four points may be used to define a quadrilateral in space that fits within the plane segment or that encloses the plane segment. The plane segment normal may indicate an orientation of the plane segment. The plane segment normal may be associated with a value that indicates the area of the plane segment.

In some embodiments, the plane segments may be obtained from saved data, for example, the persisted world 162. Alternatively or additionally, functions provided by a software development kit (SDK) provided with a wearable device may process sensor data to generate plane segments. In some embodiments, the plane segments may be obtained by scanning part of the environment with an AR device, which may serve as an "initial scan." In some embodiments, the length of the initial scan may be predetermined, for example, a few minutes or a few seconds, such that enough plane segments are obtained to reconstruct the environment. In some embodiments, the length of the initial scan may be dynamic, ending when plane segments sufficient for reconstructing the environment are obtained.

In some embodiments, a plane segment may be derived from one or more brick planes. In some embodiments, the shapes of plane segments may be random, depending on the depth and/or image information captured by an AR device within a predetermined time. In some embodiments, the shape of a plane segment may be or may not be identical to another plane segment.

In some embodiments, an AR system may be configured to obtain a number of plane segments that are sufficient to identify all surface planes of the environment. In some embodiments, the number of plane segments may correspond to the number of surface planes of the environment. For example, for a room with a ceiling, a floor and four walls, four plane segments each corresponding to the four walls may be sufficient to reconstruct the room when a distance between the ceiling and the floor is known. In this exemplary scenario, each plane segment may be set as a surface plane by the AR system.

In some embodiments, the initial scan may last a few minutes or a few seconds. In some embodiments, the number of plane segments obtained may be more than the number of planar surfaces of the environment. A surface plane filter may be configured to process the obtained plane segments for surface planes of the environment by, for example, filtering out unnecessary plane segments and combining multiple plane segments into one. In some embodiments, plane segments may be processed to form groups of plane segments likely representing different portions of the same surface. A surface plane, which may be modeled as a surface of infinite extent, may be derived from each group and used to determine intersections of surfaces bounding the environment, such that corner points may then be identified. In some embodiments, a surface plane may be represented by three or more points that bound the group of plane segments from which the surface plane is derived. A surface plane normal may be computed from the points representing the surface plane. The surface plane normal may indicate an orientation of a plane that the surface plane extends.

In some embodiments, a corner point of the environment may be inferred by treating a first and a second adjacent surface planes of the environment as extending to infinity and identifying a boundary line where those planes intersect. The boundary line may then be intersected with a third surface plane, and, in some embodiments, a fourth surface plane, to identify endpoints of the boundary line. First and second surface planes may be selected as adjacent based on one or more criteria, such as: whether the planes intersect without passing through other surface planes, whether the planes intersect at a distance from a user of a wearable device that conforms to an estimated maximum size of a room, or proximity of the centroids of the plane segments that were used to identify each of the surface planes. The first and second surface planes may be selected from those planes having a generally vertical orientation, such that they represent walls bounding the portion of the environment. A criteria, such as a normal that is within some threshold angle of 0 degrees, may be used to select vertical planes. The third and fourth surface planes may be selected from planes having a horizontal orientation, such as a normal that is within some threshold angle of 90 degrees. In some embodiments, the threshold angles may be different for horizontal and vertical planes. For example, the threshold angle may be greater for horizontal planes to identify planes that represent sloped ceilings, for example. In some embodiments, SDK provided with a wearable device may provide surface planes according to, for example, a user request indicating the requested types of the surface planes including, for example, ceiling planes, floor planes, and wall planes.

Regardless of the manner in which surface planes are selected for processing, combinations of adjacent vertical planes may be processed to identify other boundary lines which may then further be intersected with one or more horizontal planes to identify corner points. The AR system may iterate the process until a full set of corner points of the environments are inferred/determined. A full set may be determined when the identified corner points define a closed space. If the information obtained during the initial scan is inadequate to form a closure, additional scans may be performed.

Figure 20:
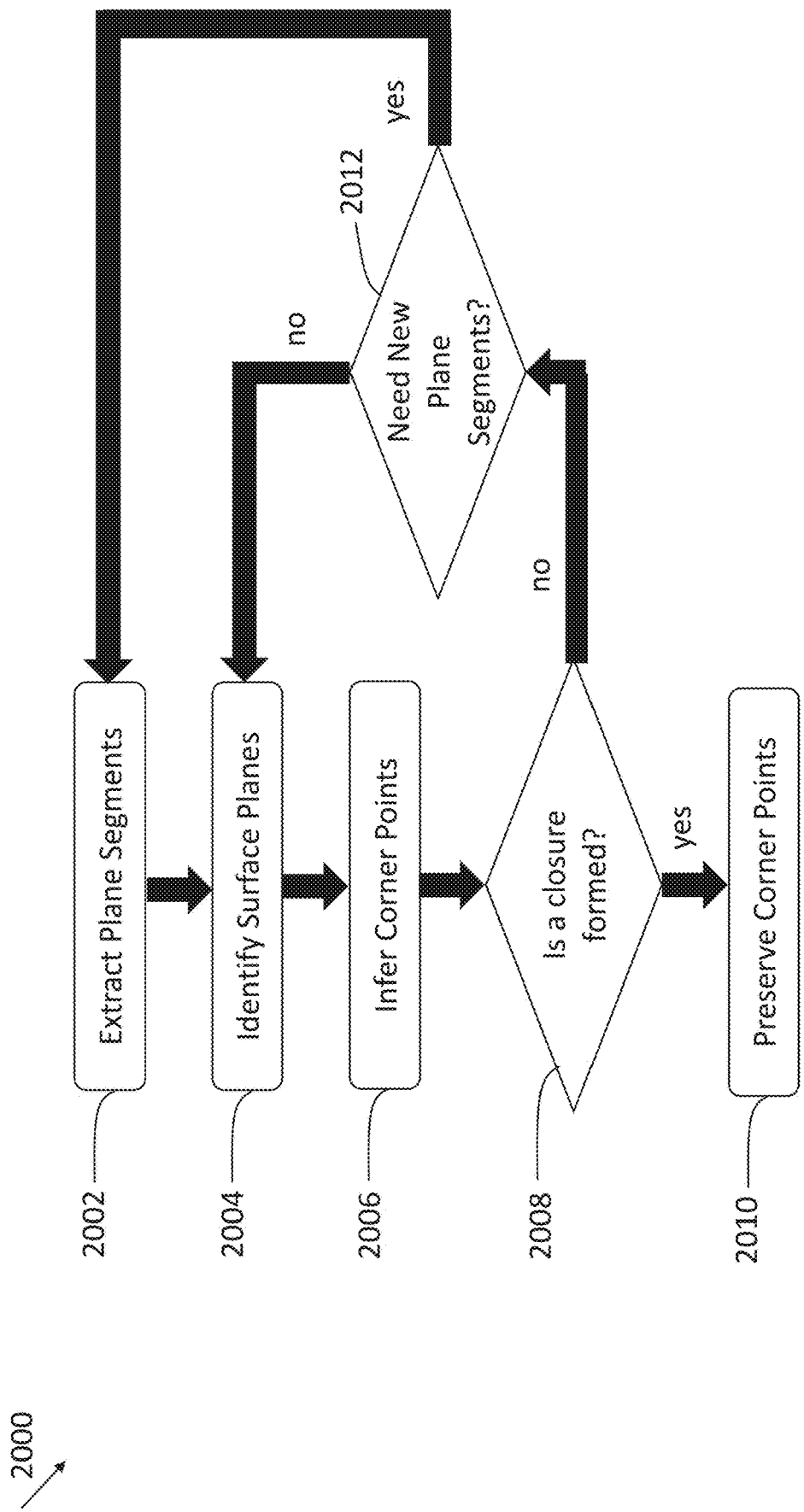
FIG. 20 is a flow chart illustrating a method of operating an AR system to generate a 3D reconstruction of an environment, according to some embodiments.

FIG. 20 shows an exemplary method 2000 of operating an AR system to generate a 3D reconstruction of an environment, according to some embodiments. The methods described in connection with FIGS. 20-29 may be performed in one or more processors of an XR system. The method 2000 may start by extracting (Act 2002) plane segments of an environment.

Figure 24:
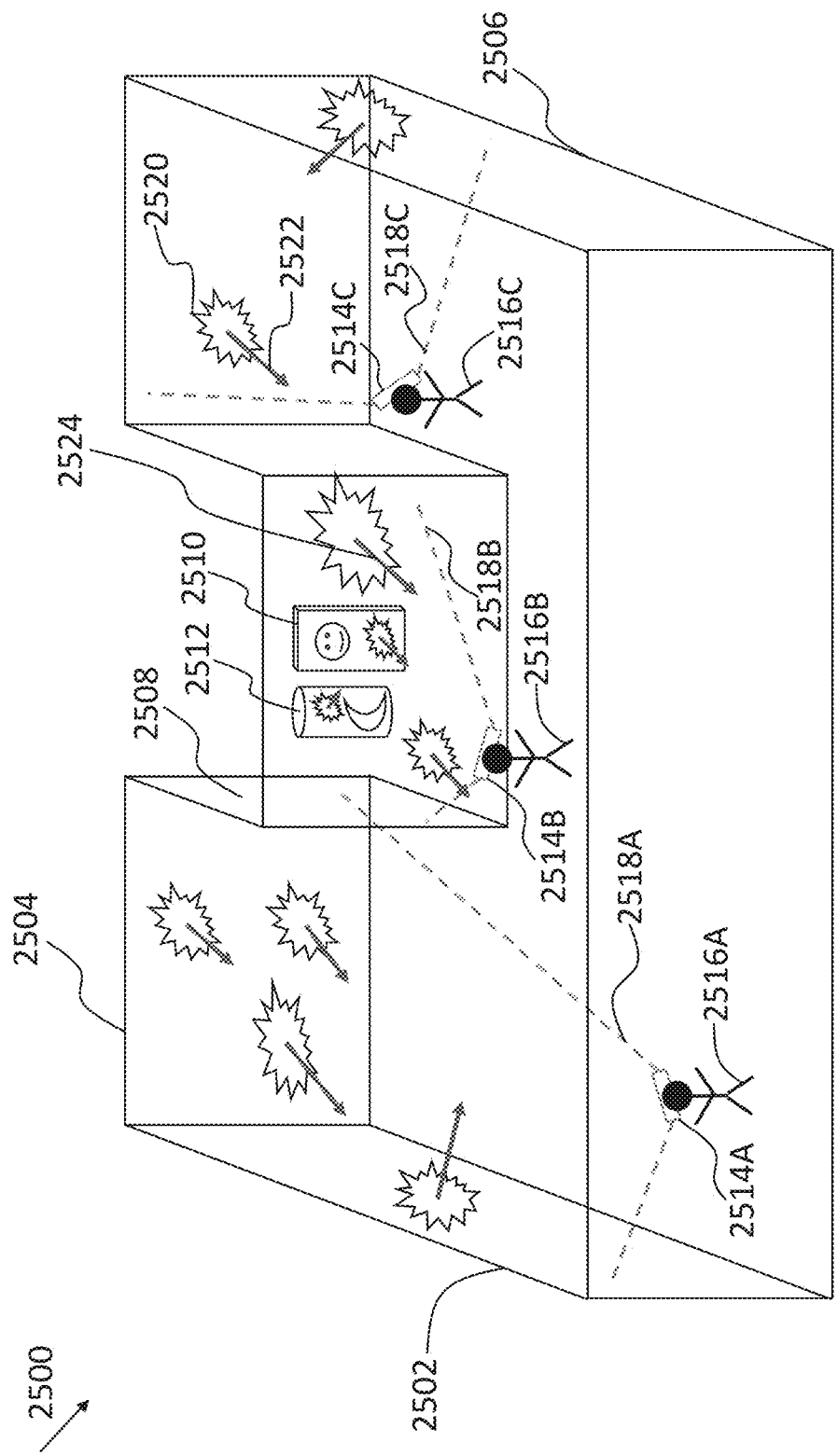
FIG. 24 is a simplified schematic diagram illustrating plane segment extraction of an environment, according to some embodiments.

Extracting plane segments is illustrated in FIG. 24, which depicts an exemplary environment 2500. In this example, the environment 2500 is a room 2502 in an art museum. The room 2502 may be bounded by a ceiling 2504, a floor 2506, and walls 2508. A wall 2508 may be used to exhibit one or more art works, for example, a painting 2510 with a flat surface and an art piece 2512 with a curved surface. It should be appreciated the method 2000 is not limited to reconstructing a room like the room 2502, and may be applied to reconstruct any kinds of environment including, without limitation, a room with multiple ceilings, multiple floors, or vaulted ceilings.

Users 2516A-2516C within this environment 2500 may wear respective AR devices 2514A-2514C. The AR devices 2514A-2514C may have corresponding fields of view 2518A-2518C. Within its corresponding field of view, during an initial scan, an AR device may obtain plane segments 2520. In some embodiments, the AR device may extract plane segments from depth and/or image and/or other information captured by sensors in the AR device. The AR device may represent a plane segment with information that defines location, orientation and area encompassed by that plane segments. As an example, a plane segment may be represented by three or more points that bound an area having substantially similar depth relative to a user or otherwise identified as being a flat surface. In some embodiments, each point may be represented by its position in a coordinate system. In some embodiments, the coordinate system may be fixed, for example, using a reference in the environment as an origin, which makes it easier to be shared between users. In some embodiments, the coordinate system may be dynamic, for example, using the location of the user as an origin, which simplifies data and reduces calculations required to display the environment to the user.

For each plane segment, a plane segment normal 2522 may be computed. In some embodiments, the plane segment normal may be in the format of a vector. The plane segment normal may indicate an orientation of the respective plane segment. The plane segment normal may also have a value, which indicates the size of the area covered by the plane segment.

Referring back to FIG. 20, the method 2000 may include identifying (Act 2004) one or more surface planes based at least in part on the obtained plane segments. In some embodiments, the surface planes may be identified ad hoc by a user. In the example illustrated in FIG. 24, the extracted plane segments within the FOV 2518B may be displayed on the AR device 2514B and visible to the user 2516B. The user may indicate to the AR device 2514B that the plane segment normal 2524 should be set as the dominant surface plane normal for a wall by, for example, pointing to the plane segment displaying on the AR device 2514B.

Figure 21:
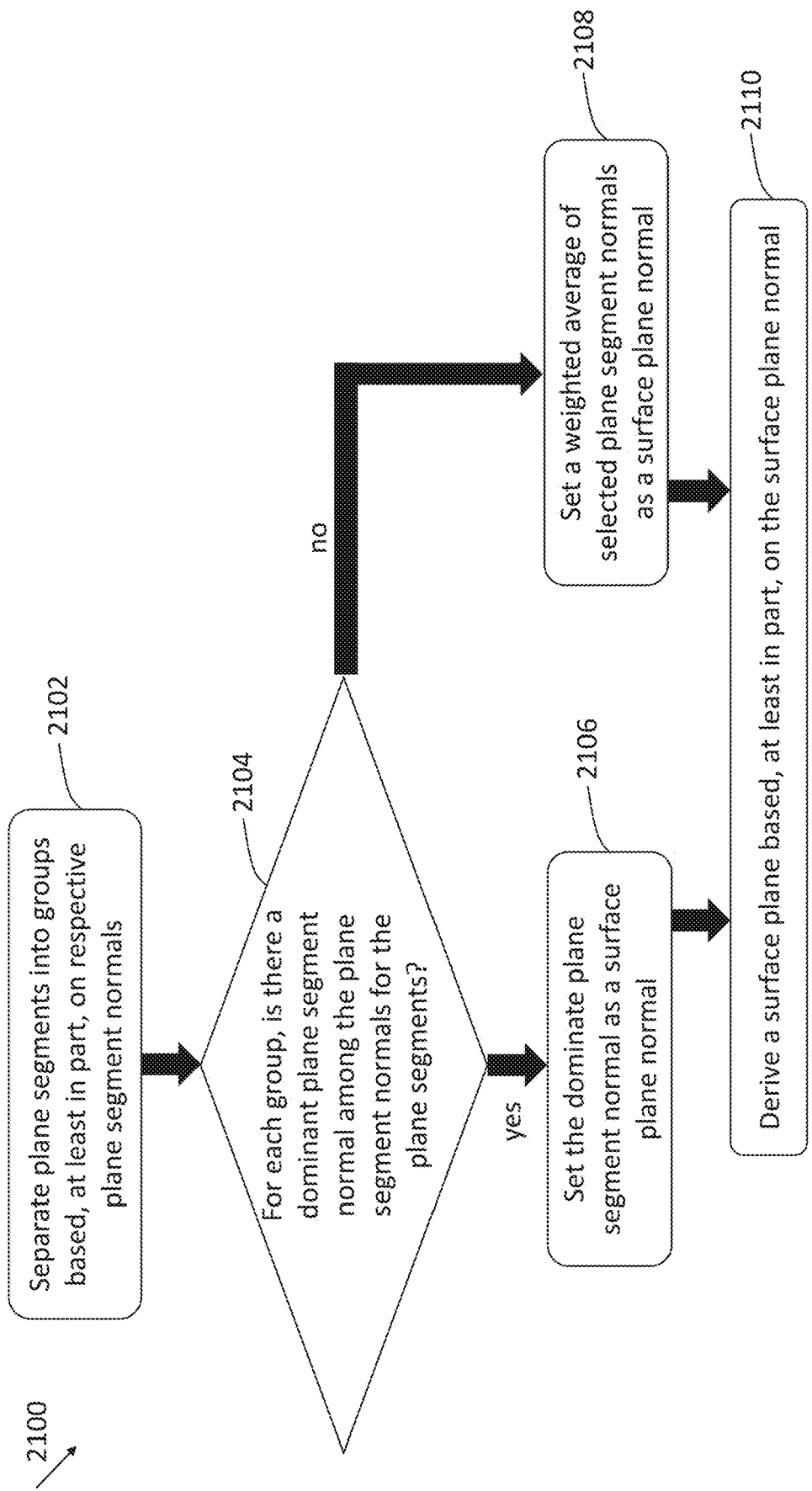
FIG. 21 is a flow chart illustrating a method of identifying surface planes based at least in part on plane segments obtained in FIG. 20, according to some embodiments.

In some embodiments, the surface planes may be identified by a method automatically, or semi-automatically with no or partial user input. FIG. 21 depicts an exemplary method 2100 for the Act 2004, according to some embodiments. The method 2100 may start by separating (Act 2102) the obtained plane segments into different groups based on one or more criteria.

In some embodiments, the plane segments may be grouped with user input. In the example illustrated in FIG. 24, the user 2516A may indicate to the AR device 2514A that one of the four plane segments displayed within FOV 2518A should be set as a first group. The AR device may be configured to interpret this user input as indicating that the rest of plane segments within FOV 2518A should be set as a second group different from the first group such that the user may point to the one plane segment and then quickly move on to scan different spaces of the environment. In some situations, the partial user input may speed up the performance of the method 2100.

In the illustrated embodiment, at least one such criteria is based on respective plane segment normals. In some embodiments, plane segments, which have plane segment normals within an error range, may be grouped together. In some embodiments, the error range may be predetermined, for example, below 30 degrees, below 20 degrees, or below 10 degrees. In other embodiments, the boundaries of the groups may be determined dynamically, such as by using clustering algorithms. As a further example, plane segments may be grouped based on distance between the plane segments. The distance between two plane segments may be measured, for example, at a centroid of a first plane segment, in a direction parallel to the normal of that plane segment.

The distance may be measured from the centroid to the intersection with a plane containing the second plane segment.

Alternatively or additionally, one or more criteria may be used to select or exclude plane segments from groups. For example, only plane segments above a threshold size may be processed. Alternatively or additionally, plane segments that are too large, such that they are larger than the likely dimensions of a room, may be excluded. Sorting may be based on other criteria, such as orientation of the plane segments, such that only horizontal or vertical wall segments, or wall segments having orientations that otherwise could represent walls, floors or ceilings may be processed. Other characteristics, such as color or texture of the wall segments may alternatively or additionally be used. Likewise, distance from a user or other reference point may be used to assign plane segments to groups. Distance, for example, may be measured in a direction parallel to the normal of the plane segment or using other criteria that groups segments of the same surface together.

Regardless of how the plane segments are selected and grouped, the groups may then be processed such that a surface plane is derived from the plane segments in each group. At Act 2104, it may be determined whether there is a dominant plane segment normal among the plane segment normals for each group. In some embodiments, the dominant plane segment normal may be determined by comparing the sizes of the plane segments associated with the plane segment normals, which may be indicated by the values representing area of the plane segment associated with the plane segment normals. If a plane segment normal is associated with a plane segment that is significantly larger than other plane segments, the plane segment normal associated with the significantly larger plane segment may be selected as the dominant plane segment normal.

A statistical distribution of sizes of plane segments may be used to determine if there is a dominant plane normal. For example, if the largest plane segment exceeds the average size of other plane segments in a group by more than one standard deviation, it may be selected as the dominant plane segment normal. Regardless of how the dominant plane segment normal is determined, at Act 2106, the dominant plane segment normal may be set as a surface plane normal, which may then be used to define a surface plane representing a surface.

If a dominant plane segment normal is not detected as a result of processing at Act 2104, at Act 2108, a surface plane normal may be derived from the plane segment normals of the plane segments in the group. FIG. 21 illustrates, for example, that a weighted average of selected plane segment normals of the group may be set as a surface normal. The weighting may be proportional to the size of plane segments associated with plane segment normals such that the result may be influenced by the surface area for which the same or similar orientation is measured.

The selected plane segment normals may include all the plane segment normals in the group, or a portion of all the plane segment normals in the group selected by, for example, removing plane segment normals associated with plane segments that are smaller than a value threshold (e.g., a number of brick planes), and/or have an orientation outside a threshold. This selection may be performed at any suitable time, and may, for example, be performed as part of Act 2108 or may alternatively or additionally be performed as part of separating plane segments into groups in Act 2102.

At Act 2110, the method 2000 may derive a surface plane based on the surface plane normal. When a dominant plane segment normal is detected, the plane segment corresponding to the dominant plane segment may be saved as the surface plane. When a dominant plane segment normal is not detected, the surface plane may be derived by Act 2108. Regardless of how the surface plane normal is determined, the surface plane may be represented by three or more points, which may be taken as representing an infinite plane (e.g., surface plane 2616 as illustrated) perpendicular to the surface plane normal. In some embodiments, the surface plane may include metadata including, for example, where the group of plane segments were centered or how much surface area was detected in the plane segments of the group. In some embodiments, the surface plane may be a segment of a surface of the environment (e.g., surface plane 2614 as illustrated), which may have the same format as a plane segment.

Figure 25:
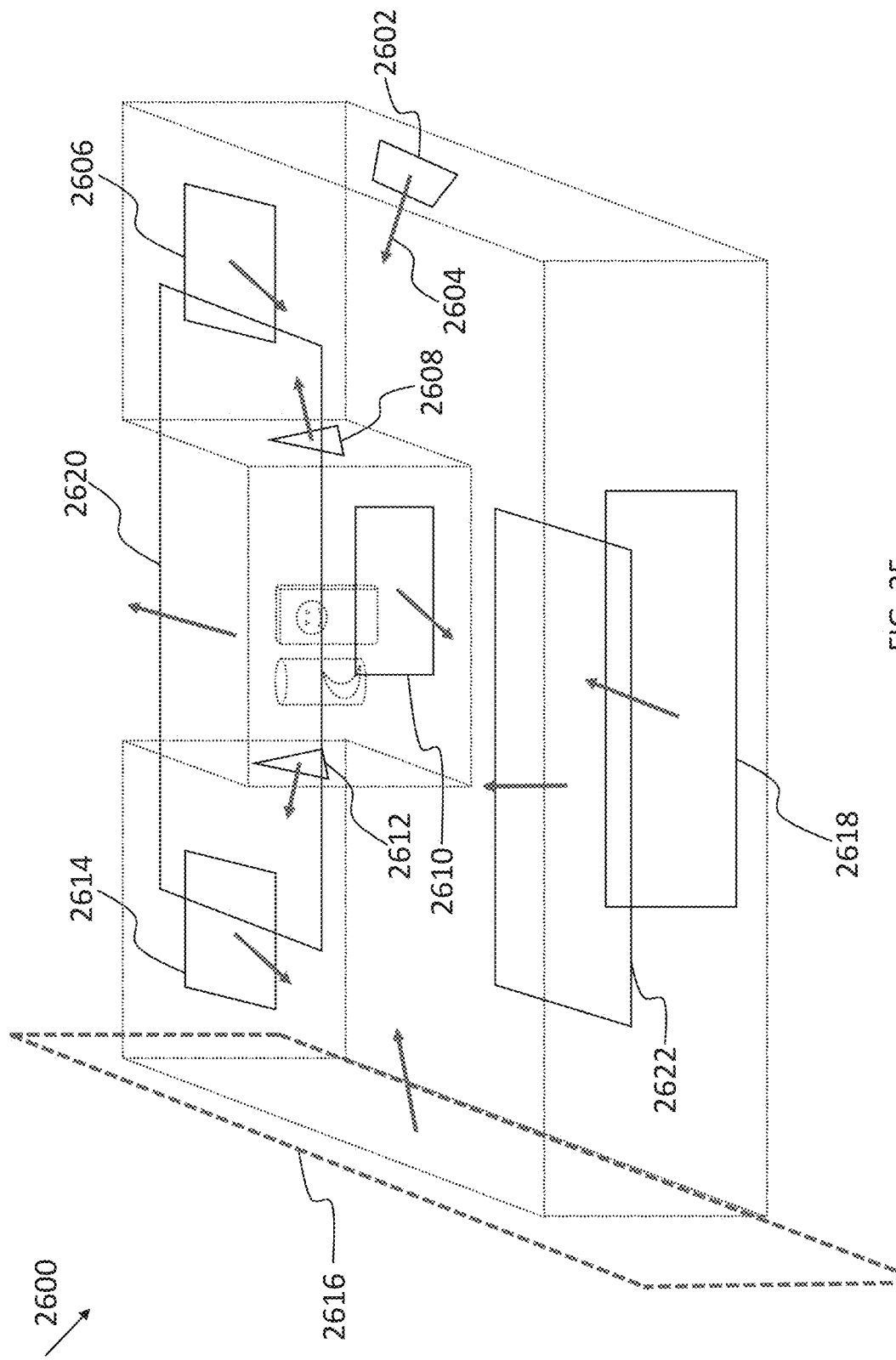
FIG. 25 is a simplified schematic diagram illustrating surface planes identified based on the extracted plane segments of the environment in FIG. 24, according to some embodiments.

Referring to FIG. 25, which depicts a simplified schematic diagram 2600 of the environment 2500, the diagram 2600 may include surface planes 2602-2620, which may be identified based on the extracted plane segments 2520 in FIG. 24, according to some embodiments. In the illustration of FIG. 25, the surface planes are shown truncated such that they can be illustrated, but it will be appreciated that surface planes may not have an area associated with them, as they may be treated as being infinite. As an example, surface plane 2610 may be identified based at least in part on the plane segments captured by the AR device 2514B worn by the user 2516B (FIG. 24). In the illustrated example, the painting 2510 with a flat surface and the art piece 2512 with a curved surface are within the field of view 2518B. Plane segments extracted from the art piece may be removed before computing the surface plane because the plane normal for the curved surface may be out of the error range. Plane segments extracted from the painting may be removed before computing the surface plane because the value of the plane normal for the painting may be significantly smaller than the values of planes segments extracted from the wall behind it. As another example, surface planes 2614 and 2616 may be identified based at least in part on the plane segments extracted by the AR device 2514A worn by the user 2516A. The extracted plane segments may be separated into two groups for computing surface planes 2614 and 2616, respectively.

Figure 22:
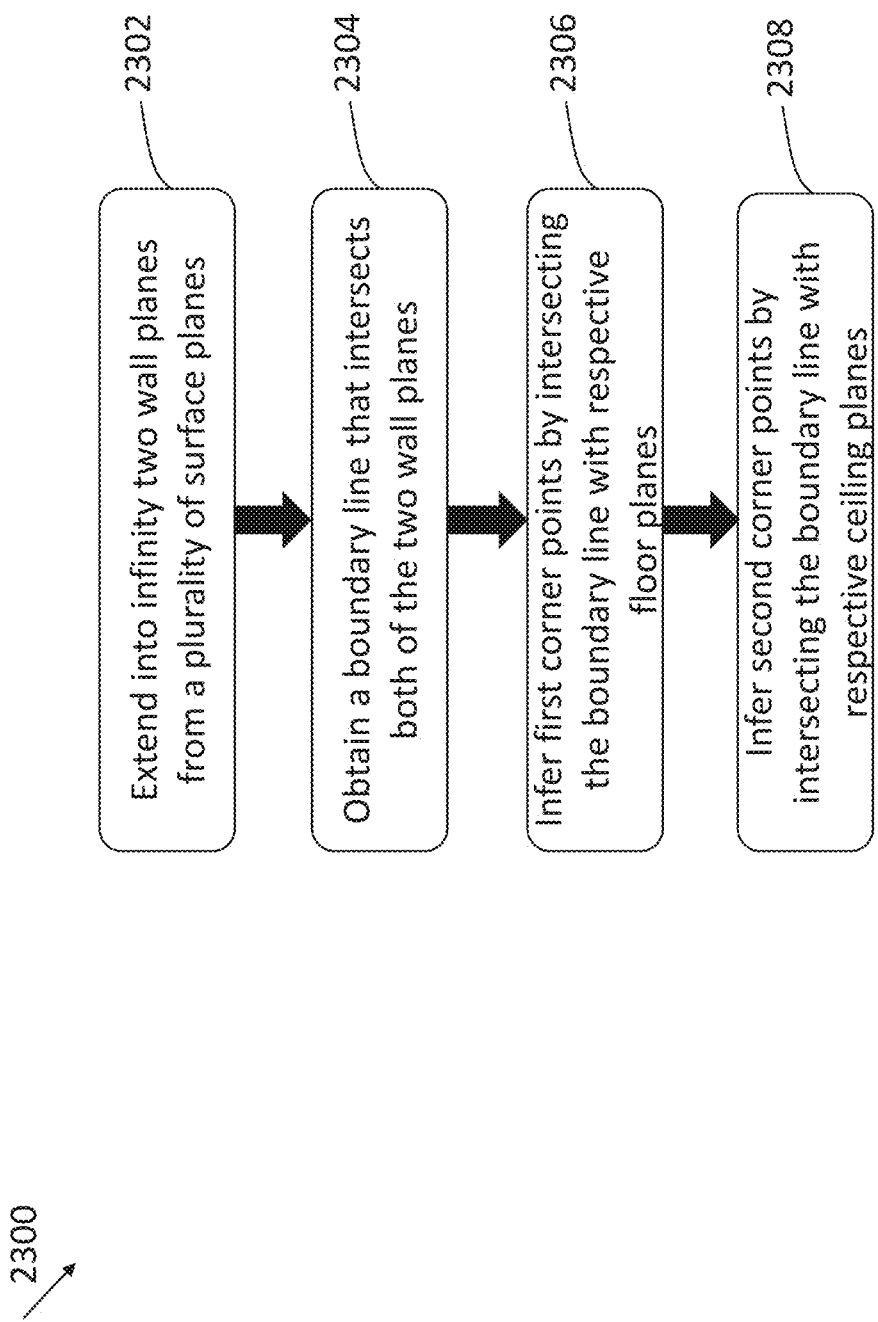
FIG. 22 is a flow chart illustrating a method of inferring corner points in FIG. 20, according to some embodiments.

Referring back to FIG. 20, the method 2000 may include inferring (Act 2006) one or more corner points of the environment based at least in part on the surface planes. FIG. 22 depicts a method 2300 for the Act 2006, according to some embodiments. The method 2300 may start by extending (Act 2302) two wall planes (e.g., surface planes 2602 and 2606) into infinity. In some embodiments, wall planes may be selected from those planes having a generally vertical orientation, such that they represent walls bounding the portion of the environment. In some embodiments, the method 2300 may include tracing a path from an intersecting surface plane to another intersecting surface plane, for example, in a direction defined by wall planes. If the path forms a loop, the method 2300 may determine a closure is formed. If the path encounters an identified surface plane that intersects one plane but not a second plane, which indicates a break in the path, the method 2300 may determine there is no closure. In some embodiments, center-to-center distances (e.g., d in FIG. 26) between wall planes may be calculated. The method 2300 may start with the two wall planes having the smallest center-to-center distance.

Figure 26:
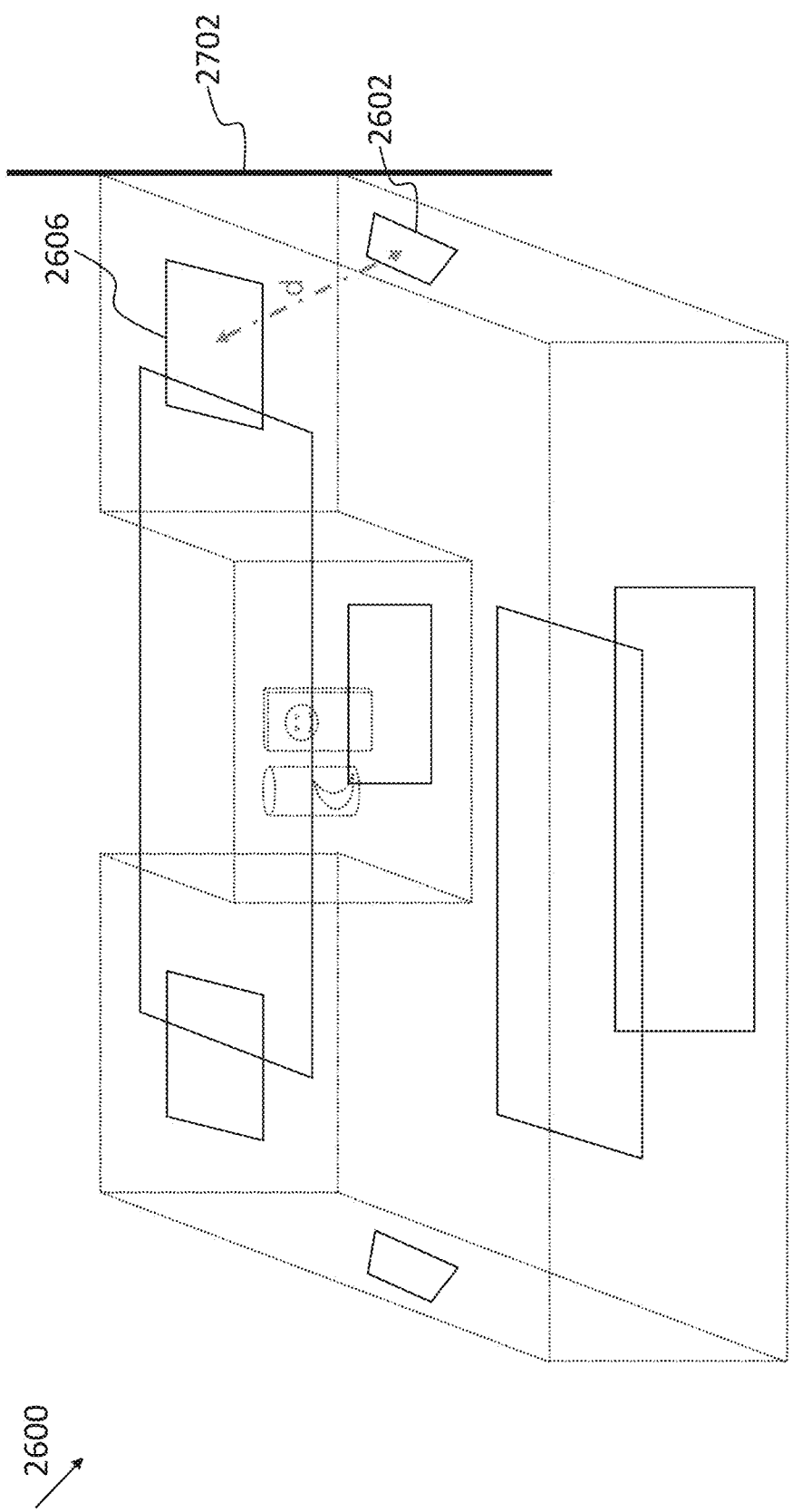
FIG. 26 is a simplified schematic diagram illustrating a boundary line obtained by intersecting two wall planes in FIG. 25, according to some embodiments.
Figure 27:
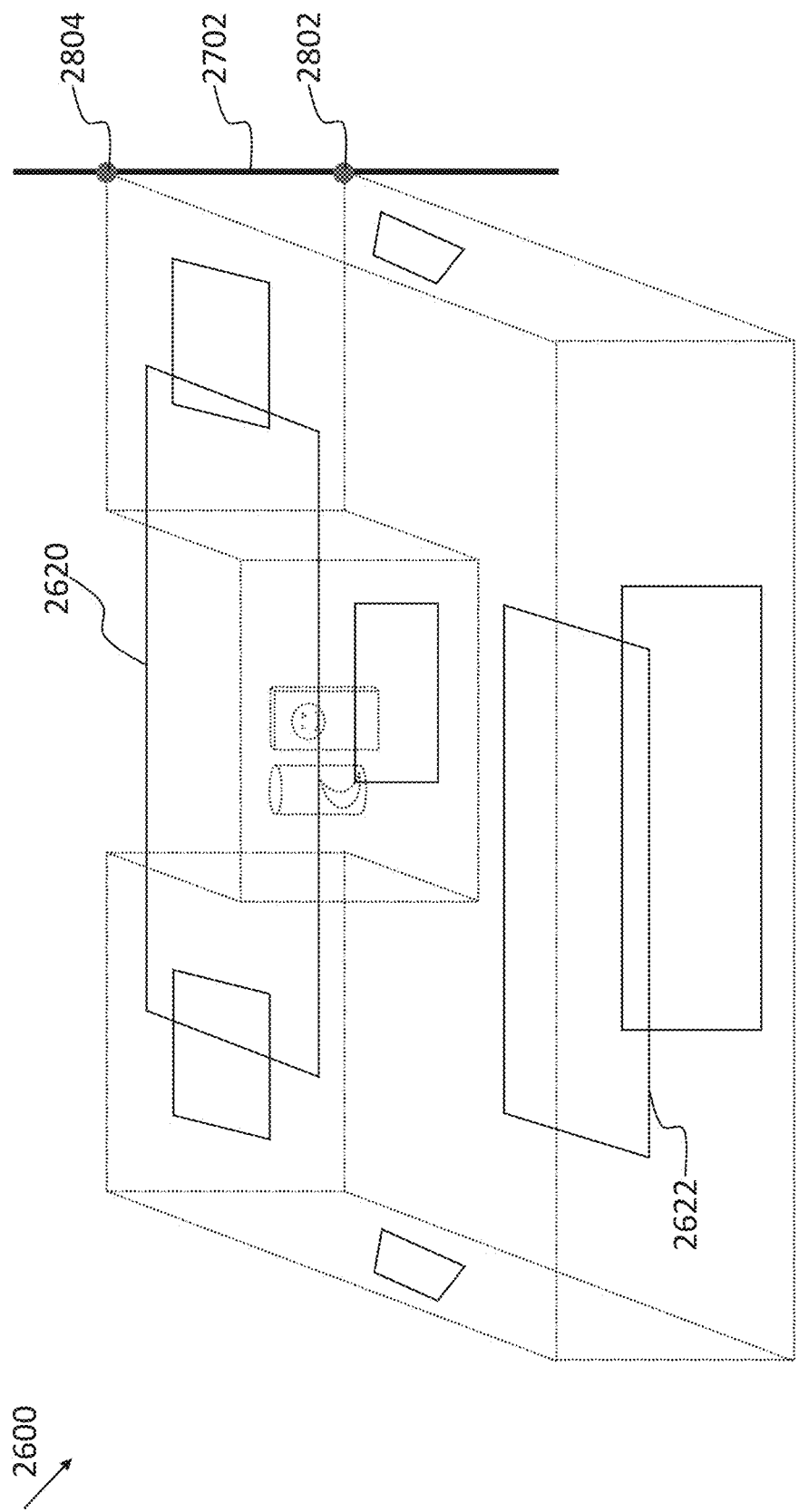
FIG. 27 is a simplified schematic diagram illustrating corner points inferred by intersecting the boundary line in FIG. 26 with a floor plane and a ceiling plane in FIG. 25, respectively, according to some embodiments.

The method 2300 may include obtaining (Act 2304) a boundary line that intersects both of the two wall planes. The line may be obtained by computations that manipulate compute representations of the geometric structures described herein. For example, as illustrated in FIG. 26, boundary line 2702 intersects both surface planes 2602 and 2606. At Act 2306, one or more first corner points may be inferred by intersecting the boundary line with respective floor planes. For example, as illustrated in FIG. 27, a first corner point 2802 is inferred by intersecting the boundary line 2702 with floor plane 2622. At Act 2308, one or more second corner points may be inferred by intersecting the boundary line with respective ceiling planes. As illustrated in FIG. 27, a second corner point 2804 is inferred by intersecting the boundary line 2702 with ceiling plane 2620. Although the illustrated room 2500 has one ceiling and one floor, it should be appreciated that some rooms may have multiple ceilings or floors. For example, a boundary line at the transition of two floor planes may result in two first corner points. Similarly, a boundary line at the transition of two ceiling planes may result in two second corner points.

Referring back to FIG. 20, the method 2000 may include determining (Act 2008) whether the inferred corner points bound a closed space such that the set of points can be confirmed as an accurate representation of a room or interior environment. In some embodiments, the determining indicates that a closure is formed if the boundary lines joining the corner points can be connected to define surfaces that join up and bound a closed volume. In some embodiments, the determining indicates that a closure is formed if wall planes bound by the corner points form a loop.

In some embodiments, when the computation indicates that a closure is formed, at Act 2010, the corner points may be saved—they may be stored, for example, in a local memory and/or communicated over a computer network to be stored in a remote memory. When the computed result indicates that a closure has not yet been formed, some of Acts 2002-2006 may be repeated a number of times until a closure formed or an error in data detected. In each iteration, for example, additional data might be gathered or accessed such that more plane segments are used at Act 2002, increasing the chances that a closure will be formed. In some embodiments, an error may mean that the inferred corner points are not in a space that is amendable to a simple representation. In some embodiments, in response to an error, the system may present a user interface, offering a user an option to intervene by, for example, indicating that there is a surface plane in a location where the sensors detected no plane segments or indicating that there is no surface plane in a location for which the system misgrouped some extracted plane segments.

In the illustrated example, at Act 2012, the AR system determines whether new plane segments are required. When it is determined that new plane segments are required, the method 2000 may perform Act 2002 to capture additional plane segments. When it is determined that new plane segments are not required and instead that, for example, the captured plane segments should be re-grouped, the method 2000 may perform Act 2004 to obtain additional surface planes and/or replace existing surface planes.

Figure 23:
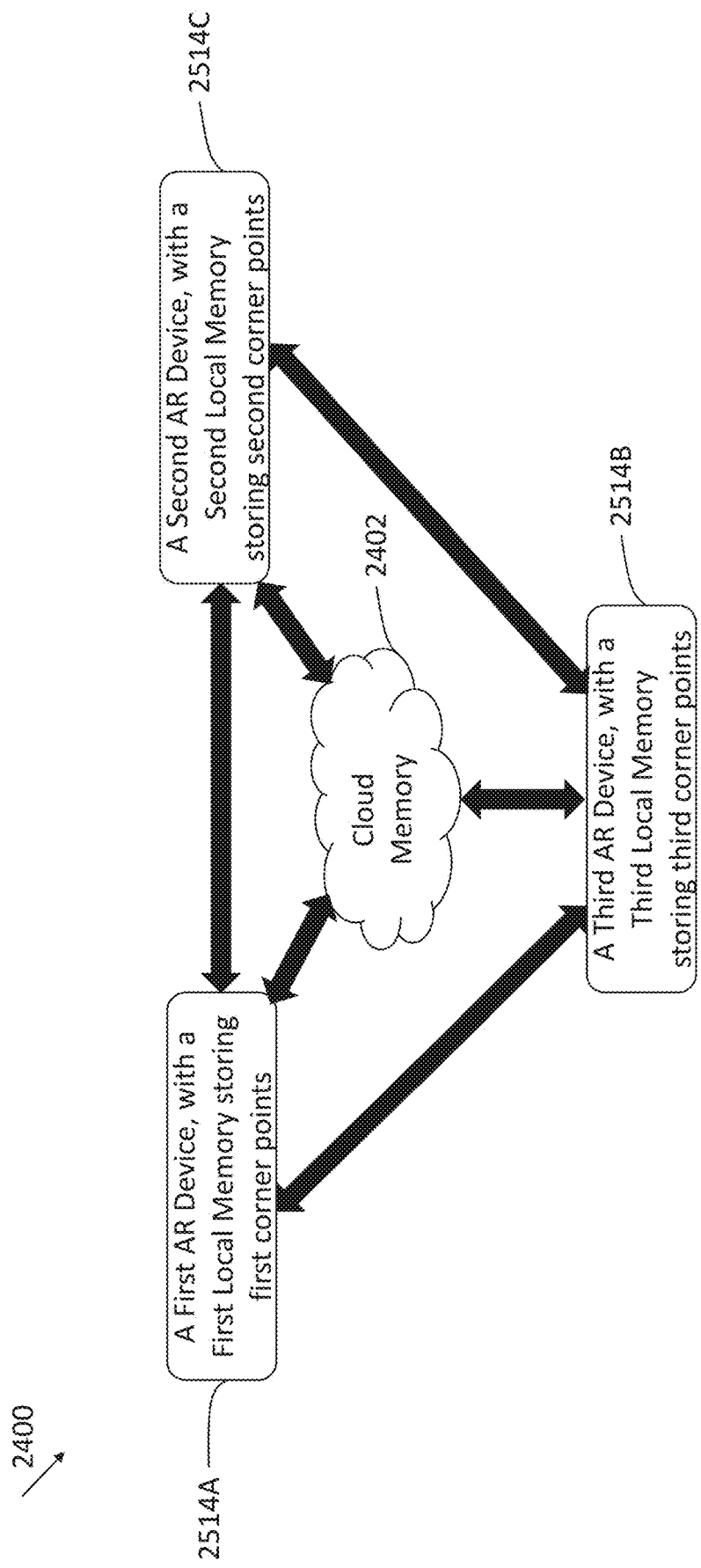
FIG. 23 is a simplified schematic diagram illustrating an AR system configured to perform the method of FIG. 20, according to some embodiments.

FIG. 23 depicts a simplified schematic diagram illustrating a system 2400 configured to perform the method 2000, according to some embodiments. The system 2400 may include cloud memory 2402 and AR devices 2514A, 2514B and 2514C configured to communicate with the cloud memory 2402 and other AR devices. The first AR device 2514A may include a first local memory storing first corner points inferred from plane segments extracted by the first AR device. The second AR device 2514B may include a second local memory storing second corner points inferred from plane segments extracted by the second AR device. The third AR device 2514C may include a third local memory storing third corner points inferred from plane segments extracted by the third AR device.

In some embodiments, when an application running on the first AR device requires a 3D representation of the environment 2500, the first AR device may retrieve second corner points and third corner points from the cloud memory to build a 3D representation of the room 2500, for example, a mesh model 2900 illustrated in FIG. 28. The mesh model may be useful in various ways. For example, the mesh model 2900 may be used by a home contracting application running on an AR device to compute the amount of paint needed to cover the room 2500. Compared to using a conventional model obtained by scanning the entire room, the mesh model 2900 can be achieved by partially scanning the room while gives accurate and quick results.

In some embodiments, in a multi-user experience, the AR devices may be scanning an environment together. The AR devices may communicate with each other corner points identified, and thus identify all corner points of the environment with less time than a single user would.

CONCLUSION

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A portable electronic system comprising:
a sensor configured to capture information about a physical world;
a processor configured to execute computer executable instructions to compute a three-dimensional (3D) representation of a portion of the physical world based at least in part on the captured information about the physical world, wherein the computer executable instructions comprise instructions for:
extracting a plurality of plane segments from the sensor-captured information, wherein the plurality of plane segments are associated with orientations of planes that individual plane segments represent;
identifying a plurality of surface planes based at least in part on the plurality of plane segments; and
inferring a plurality of corner points of the portion of the physical world based at least in part on the plurality of surface planes.

2. The portable electronic system of claim 1, wherein the computer executable instructions further comprise instructions for building a mesh model of the portion of the physical world, using the corner points.

3. The portable electronic system of claim 1, wherein the plurality of surface planes are identified at least partially based on input from a user wearing at least a portion of the portable electronic system.

4. The portable electronic system of claim 1, comprising:
a transceiver configured for communication over a computer network with a device providing remote memory.

5. The portable electronic system of claim 1, wherein the processor implements a service configured to provide the 3D representation of the portion of the physical world to an application.

6. The portable electronic system of claim 5, wherein the service preserves the corner points in a local memory or transfers the corner points to a cloud memory as the 3D representation of the portion of the physical world.

7. The portable electronic system of claim 1, wherein identifying the plurality of surface planes comprises:
determining whether there is a dominant plane segment normal among a group of plane segment normals of the plurality of plane segments;
when the determining indicates a dominant plane segment normal of the group, setting the dominant plane segment normal as a surface plane normal; and
when the determining indicates no dominant plane segment normal of the group, computing the surface plane normal from at least a portion of the plane segment normals of the group.

8. The portable electronic system of claim 7, wherein computing the surface plane normal comprises computing a weighted average of the at least a portion of the plane segment normals of the group.

9. The method of claim 1, wherein inferring the plurality of corner points of the portion of the physical world comprises:
extending into infinity first and second surface planes of the plurality of surface planes; and
obtaining a boundary line that intersects the first and second surface planes.

10. The method of claim 9, wherein inferring the plurality of corner points of the portion of the physical world further comprises:
inferring one of the plurality of corner points by intersecting the boundary line with a third surface plane.

11. At least one non-transitory computer-readable medium encoded with a plurality of computer-executable instructions that, when executed by at least one processor, perform a method for providing a three-dimensional (3D) representation of a physical world in which the physical world is represented with a plurality of corner points, the method comprising:
capturing information about a first portion of the physical world that is within a field-of-view (FOV) of a first user;
extracting a plurality of plane segments from the captured information;
identifying a plurality of surface planes from the plurality of plane segments;
computing a first plurality of corner points representing the first portion of the physical world based on intersections of surface planes of the plurality of identified surface planes;
receiving from a second user a second plurality of corner points of a second portion of the physical world; and
providing the 3D representation of the physical world based at least in part on the first and second plurality of corner points.

12. The method of claim 11, comprising:
computing whether the first plurality of corner points form a closure.

13. The method of claim 12, wherein
computing whether a closure is formed comprises determining whether boundary lines joining the first plurality of corner points can be connected to define surfaces that join up and bound a closed volume.

14. The method of claim 11, comprising:
communicating over a computer network the corner points computed from information captured about the first portion of the physical world that is within the FOV of the first user;
receiving the communicated corner points at an XR device used by a third user; and
rendering information, with the XR device, to the third user about the physical world based on the received plurality of corner points.

15. The method of claim 11, comprising:
computing metadata for the corner points, the metadata indicating location relationships between the corner points.

16. The method of claim 15, comprising:
preserving the corner points, including respective metadata, such that the corner points are retrievable by a plurality of users including the user.

17. A method of operating a cross reality system to reconstruct an environment, the cross reality system comprising a processor configured to process image information in communication with a sensor worn by a user that generates depth information for respective regions in a field of view of the sensor, the method comprising:
extracting a plurality of plane segments from the depth information;
displaying the extracted plane segments to the user;
receiving user input indicating a plurality of surface planes, each representing a surface bounding the environment;
computing a plurality of corner points of the environment based at least in part on the plurality of surface planes; and computing metadata for the corner points, the metadata indicating location relationships between the corner points.

18. The method of claim 17, wherein:

the user is a first user, the plurality of corner points are a first plurality of corner points; and the method further comprises:

receiving from a second user a second plurality of corner points; and providing a 3D representation of the environment based at least in part on the first and second plurality of corner points.

19. The method of claim 17, further comprising:

determining whether the plurality of corner points form a closure.

20. The method of claim 19, further comprising:

storing the corner points when it is determined that the closure is formed.

* * * * *

(12) EX PARTE REEXAMINATION CERTIFICATE (12838th)
United States Patent
Uscinski

(10) Number: US 11,508,141 C1
(45) Certificate Issued: Jan. 31, 2025

(54) SIMPLE ENVIRONMENT SOLVER USING PLANAR EXTRACTION

(71) Applicant: Magic Leap, inc., Plantation, FL (US)

(72) Inventor: Benjamin Joseph Uscinski, Fort Lauderdale, FL (US)

(73) Assignee: MAGIC LEAP, INC., Plantation, FL (US)

Reexamination Request:
No. 90/019,668, Sep. 18, 2024

Reexamination Certificate for:
Patent No.: 11,508,141
Issued: Nov. 22, 2022
Appl. No.: 16/912,646
Filed: Jun. 25, 2020

Related U.S. Application Data

(60) Provisional application No. 62/870,193, filed on Jul. 3, 2019.

(51) Int. Cl.
| | | |
|---|---|---|
| *G06V 10/44* | (2022.01) | |
| *G06T 7/564* | (2017.01) | |
| *G06T 7/593* | (2017.01) | |
| *G06T 17/00* | (2006.01) | |
| *G06T 19/00* | (2011.01) | |
| *G06V 20/20* | (2022.01) | |
| *G06V 40/18* | (2022.01) | |

(52) U.S. Cl.
CPC .............. *G06T 17/00* (2013.01); *G06T 7/564* (2017.01); *G06T 7/593* (2017.01); *G06T 19/006* (2013.01); *G06V 10/44* (2022.01); *G06V 20/20* (2022.01); *G06V 40/193* (2022.01)

(58) Field of Classification Search
None
See application file for complete search history.

(56) References Cited

To view the complete listing of prior art documents cited during the proceeding for Reexamination Control Number 90/019,668, please refer to the USPTO's Patent Electronic System.

*Primary Examiner* — Yuzhen Ge

(57) ABSTRACT

A method to reconstruct an environment is provided. The method makes available to a wide variety of XR applications fresh and accurate 3D reconstruction data of environments with low processing time and low usage of computational resources and storage spaces. The 3D reconstruction data are structured in a way to be efficiently shared between users for multi-user experiences. The method includes obtaining plane segments of an environment, identifying surface planes of the environment by, for example, filtering and grouping the plane segments or ad hoc selection of the plane segments by a user, and inferring corner points of the environment based on the surface planes. The corner points are used to build a 3D representation of the environment when an XR application requires.

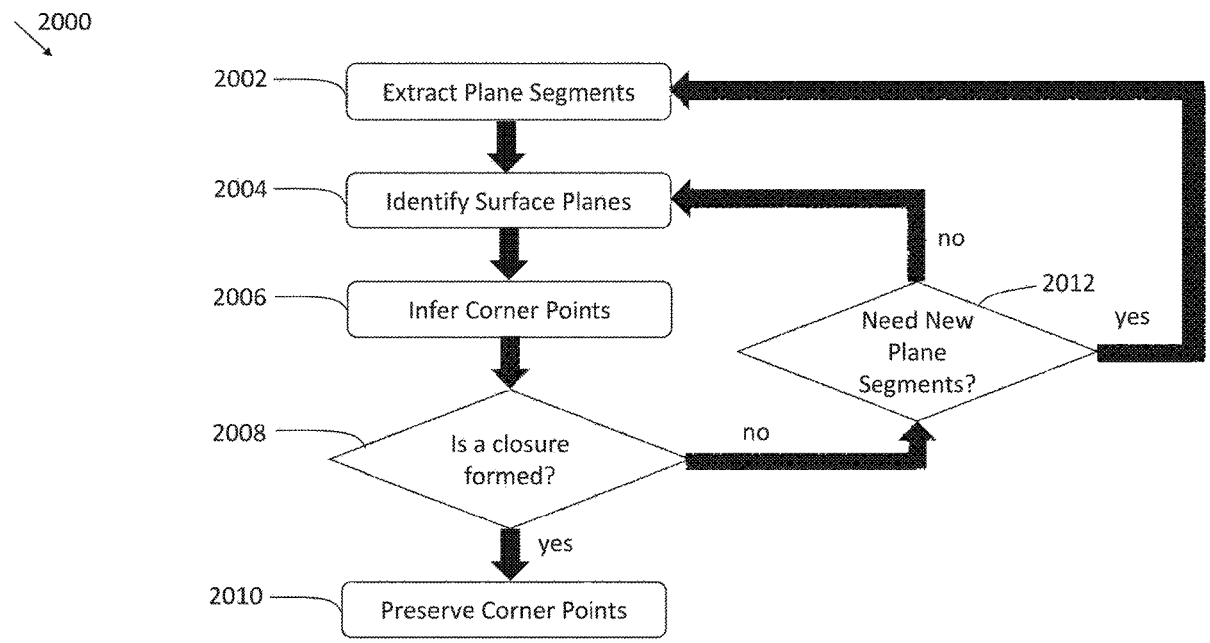

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *